US012010275B2

(12) United States Patent
Yano

(10) Patent No.: US 12,010,275 B2
(45) Date of Patent: Jun. 11, 2024

(54) INFORMATION PROCESSING APPARATUS, METHOD FOR CONTROLLING INFORMATION PROCESSING, AND STORAGE MEDIUM

(71) Applicant: CANON KABUSHIKI KAISHA, Tokyo (JP)

(72) Inventor: Shodai Yano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/173,718

(22) Filed: Feb. 23, 2023

(65) Prior Publication Data
US 2023/0199127 A1 Jun. 22, 2023

Related U.S. Application Data

(63) Continuation of application No. 17/516,055, filed on Nov. 1, 2021, now Pat. No. 11,606,470.

(30) Foreign Application Priority Data

Nov. 5, 2020 (JP) ................................. 2020-185106

(51) Int. Cl.
G06F 3/12 (2006.01)
G06F 3/0486 (2013.01)
G06F 3/0488 (2022.01)
H04N 1/00 (2006.01)

(52) U.S. Cl.
CPC ....... *H04N 1/00469* (2013.01); *G06F 3/0486* (2013.01); *G06F 3/0488* (2013.01); *H04N 1/00474* (2013.01); *H04N 1/00973* (2013.01)

(58) Field of Classification Search
CPC .......... H04N 1/00469; H04N 1/00474; H04N 1/00973; G06F 3/0486; G06F 3/0488
See application file for complete search history.

(56) References Cited

U.S. PATENT DOCUMENTS

| 2011/0199640 | A1 | 8/2011 | Shirai | |
| 2013/0235414 | A1* | 9/2013 | Iwamoto | G06K 15/4005 358/1.14 |
| 2014/0078549 | A1* | 3/2014 | Amiya | H04N 1/00411 358/1.15 |
| 2014/0155121 | A1* | 6/2014 | Haba | G06F 3/1268 455/557 |
| 2015/0293731 | A1* | 10/2015 | Yamada | G06K 15/007 358/1.15 |

FOREIGN PATENT DOCUMENTS

| JP | 2014092908 A | 5/2014 |
| JP | 2017227989 A | 12/2017 |

* cited by examiner

*Primary Examiner* — Moustapha Diaby
(74) *Attorney, Agent, or Firm* — Canon U.S.A., Inc. IP Division

(57) ABSTRACT

In a case where an image processing apparatus and a terminal display screens in an associated manner, if the terminal receives a user operation in a state where an enlarged screen is displayed only on the terminal, and the terminal transmits information about the operation as it is to the image processing apparatus, processing not intended by the user may possibly be performed. Therefore, when the terminal receives a user operation in a state where an enlarged screen is displayed only on the terminal, the terminal does not transmit the operation information as it is to the image processing apparatus.

29 Claims, 15 Drawing Sheets

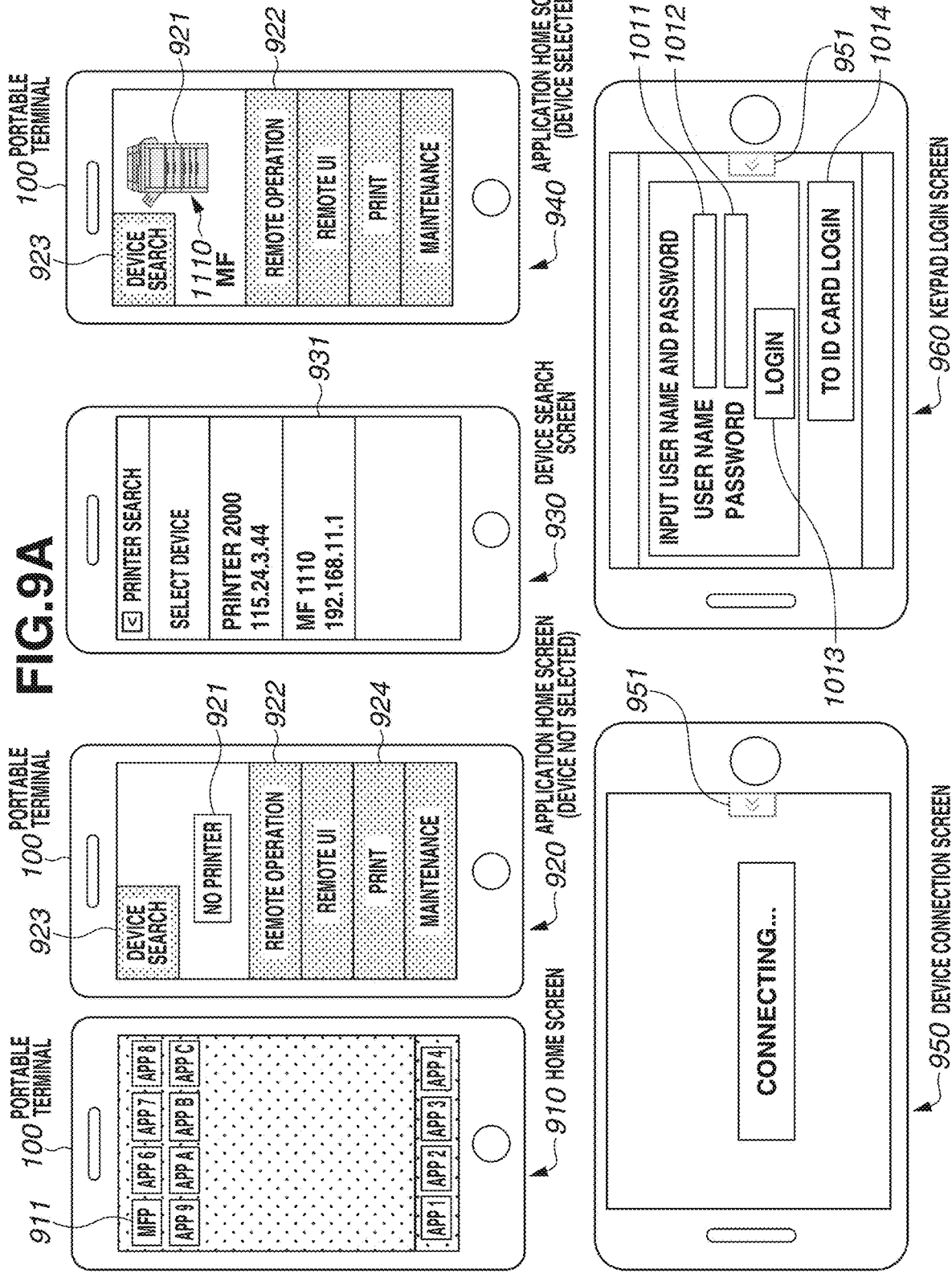

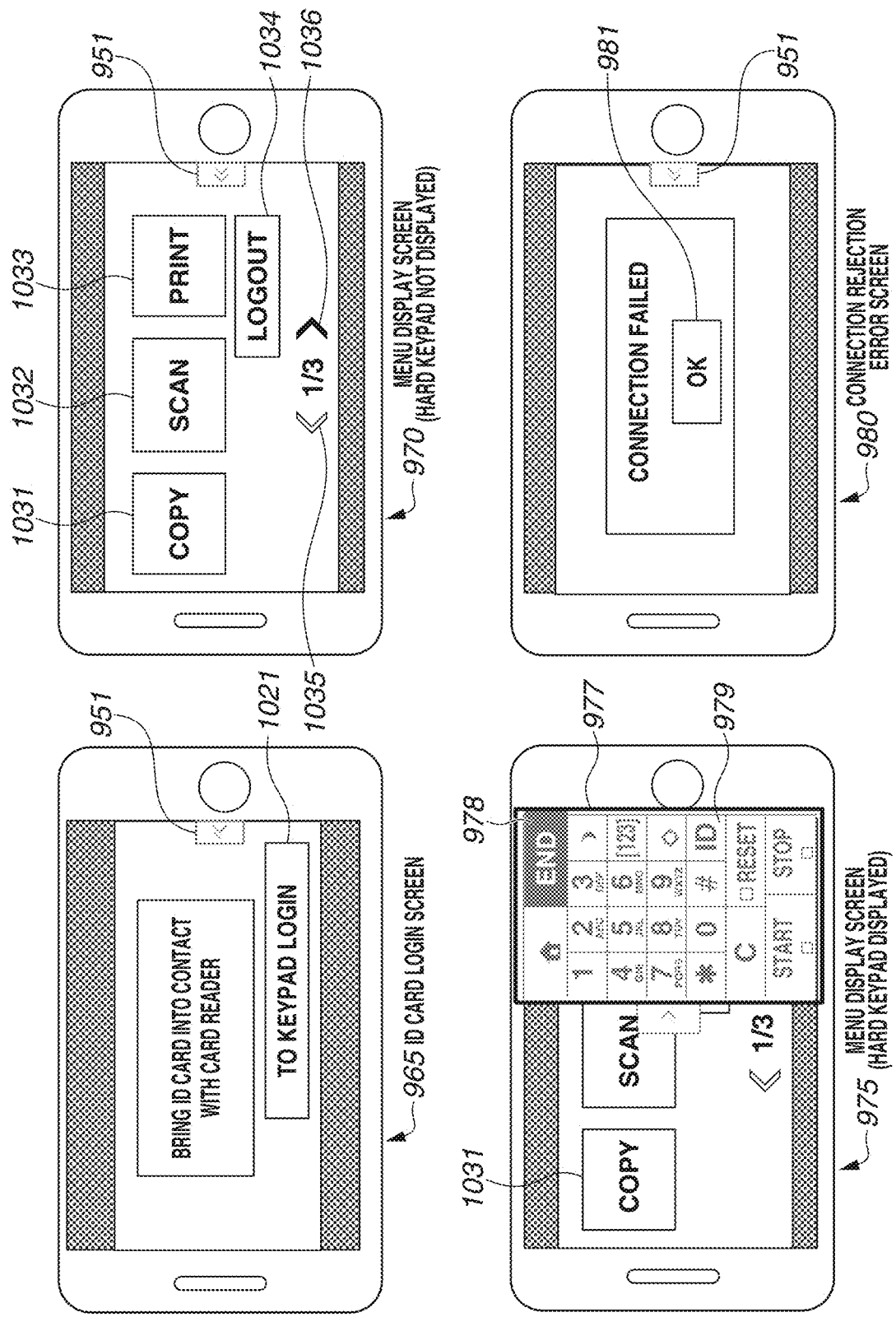

FIG.13
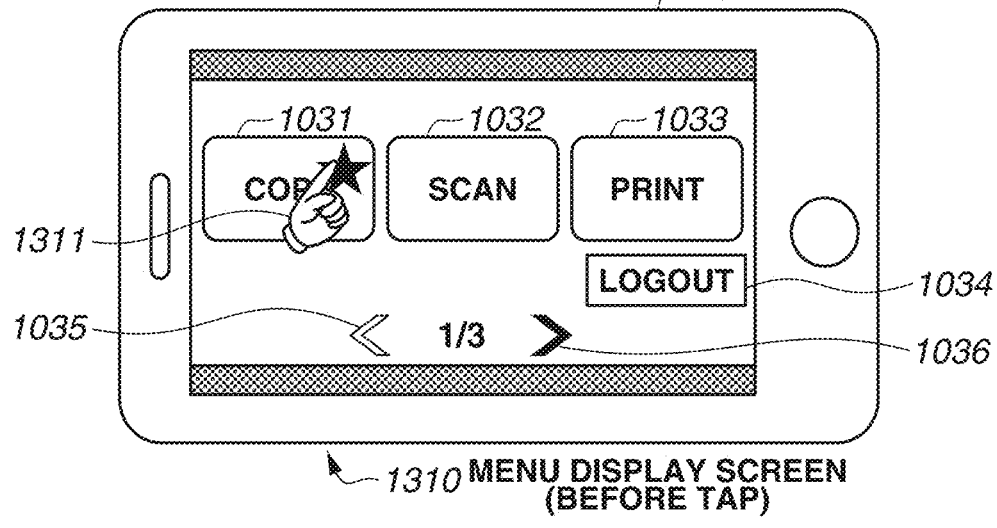
1310 MENU DISPLAY SCREEN (BEFORE TAP)
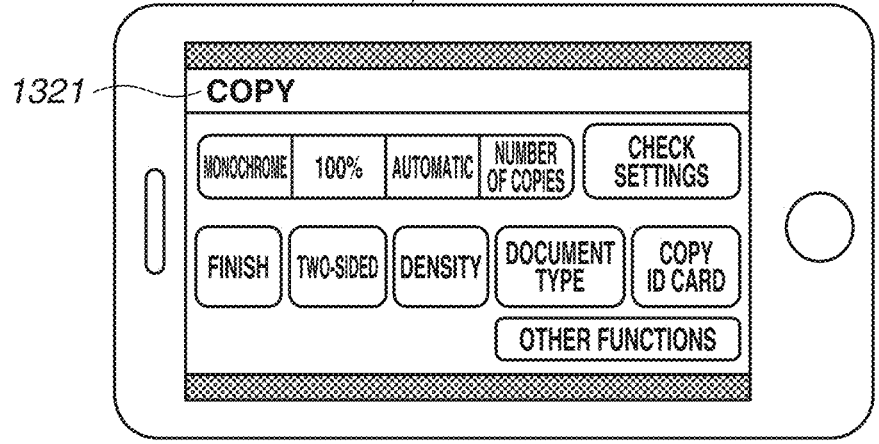
1320 COPY DISPLAY SCREEN (AFTER TAP)
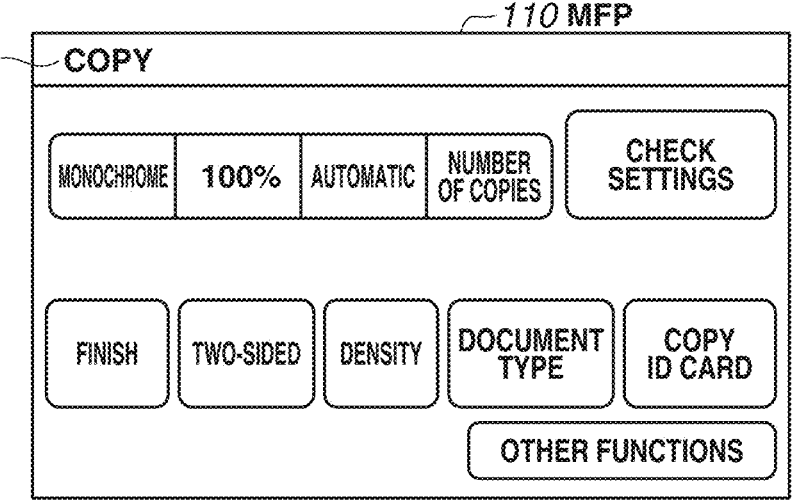
1330 COPY DISPLAY SCREEN (AFTER TAP)

INFORMATION PROCESSING APPARATUS, METHOD FOR CONTROLLING INFORMATION PROCESSING, AND STORAGE MEDIUM

CROSS-REFERENCE TO RELATED APPLICATIONS

This application is a Continuation of U.S. patent application Ser. No. 17/516,055, filed Nov. 1, 2021, which claims the benefit of Japanese Patent Application No. 2020-185106, filed Nov. 5, 2020, both of which are hereby incorporated by reference herein in their entirety.

BACKGROUND

Field of the Disclosure

The present disclosure relates to a remote control method.

Description of the Related Art

There has been discussed a method for remotely operating an operation screen of an image processing apparatus from a personal computer (PC) or a portable terminal by using Virtual Network Computing (VNC) conforming to the Remote Frame Buffer (RFB) protocol. More specifically, an image processing apparatus having a VNC server function transmits screen information for an operation screen to a terminal having a VNC client function.

The terminal displays the same screen as that of the operation screen displayed on the operation panel of the image processing apparatus, based on the received screen information. When the user operates the screen displayed on the terminal, information about the operation is transmitted from the terminal to the image processing apparatus. The image processing apparatus performs screen transition processing based on the transmitted information, and transmits information about the changed screen to the terminal. By performing an operation on the screen displayed on the terminal in this way, the user is able to perform a login operation via an operation panel provided by the image processing apparatus and instruct the image processing apparatus to perform processing without operating the operation panel of the image processing apparatus. Japanese Patent Application Laid-Open No. 2014-6668 discusses a technique used when a terminal and an image processing apparatus display screens in an associated way. When the terminal receives an operation that can be received by the terminal but cannot be received by the image processing apparatus, the terminal invalidates the operation without transmitting information about the operation to the image processing apparatus. When the terminal receives an operation that can be received by both the terminal and the image processing apparatus, the terminal transmits information about the operation to the image processing apparatus to validate the operation. However, even when the terminal receives an operation that can be received by both the terminal and the image processing apparatus, and the terminal transmits information about the operation as it is to the image processing apparatus, there may arise an issue depending on the display form of the screen on the terminal. Assume an example case where both the terminal and the image processing apparatus can receive a drag operation and are controlled to make a screen transition upon reception of a drag operation. Also, assume a state where the terminal and the image processing apparatus perform screen association, and only the terminal currently displays an enlarged screen. In this state, reception of a user's drag operation on the terminal indicates that the user drag operation intends to move an enlarged display region since the screen is enlarged on the terminal. However, if the terminal transmits information about the drag operation as it is to the image processing apparatus upon reception of a drag operation on the terminal, a screen transition will be performed, resulting in processing different from the user's intention.

SUMMARY

Embodiments of the present disclosure are directed to providing, in a case where the terminal and the image processing apparatus perform screen association, a method for performing processing intended by the user based on an operation received from the user in consideration of the display form of the screen on the terminal. According to embodiments of the present disclosure, a method for an information processing apparatus that communicates with an image processing apparatus, includes displaying a screen corresponding to a screen to be displayed on a display unit of the image processing apparatus, and generated based on a display control by the image processing apparatus, and transmitting, when a predetermined user operation is received on the displayed screen, operation information corresponding to the predetermined user operation to the image processing apparatus, wherein, in a case where the predetermined user operation on the screen is received in a state where a display form of the displayed screen has been changed, the operation information corresponding to the predetermined user operation is not transmitted to the image processing apparatus.

Further features of the present disclosure will become apparent from the following description of exemplary embodiments with reference to the attached drawings.

BRIEF DESCRIPTION OF THE DRAWINGS

FIGS. 9A and 9B are diagrams illustrating user interfaces (UIs) displayed on an operation panel of the portable terminal according to the first exemplary embodiment.

FIG. 13 is a diagram illustrating UIs displayed on the operation panels of the portable terminal and the MFP according to a third exemplary embodiment.

DESCRIPTION OF THE EMBODIMENTS

Exemplary embodiments of the present disclosure will be described below with reference to the accompanying drawings. The following exemplary embodiments are not intended to limit the present disclosure. Not all of the combinations of the features described in the exemplary embodiments are indispensable to the solutions of the present disclosure.

<System Configuration According to Present Exemplary Embodiment>

First, a system configuration according to a first exemplary embodiment will be described. Although a portable terminal 100 and a multifunction peripheral (MFP) 110 will be described as examples of information processing apparatuses, apparatuses included in an information processing system are not limited thereto. The portable terminal 100 and the MFP 110 are connected to a Local Area Network (LAN) and are capable of exchanging information with each other. The portable terminal 100 is connected to the LAN via an access point 120.

The portable terminal 100 has a Virtual Network Computing (VNC) client function to remotely control the MFP 110. More specifically, the portable terminal 100 has VNC client software conforming to the Remote Frame Buffer (RFB) protocol. The portable terminal 100 establishes a VNC link to the MFP 110 and displays, on the portable terminal 100, the screen displayed on the operation panel of the MFP 110. When MFP 110 has a VNC server function and a VNC link is established from the portable terminal 100, the MFP 110 transmits screen information to the portable terminal 100 serving as a VNC client. The portable terminal 100 draws a screen based on the transmitted screen information. Screen association is performed so that the screens to be displayed on the display units of the portable terminal 100 and the MFP 110 are changed based on the operation received on the drawn screen and the operation received on the MFP 110.

Figure 1:
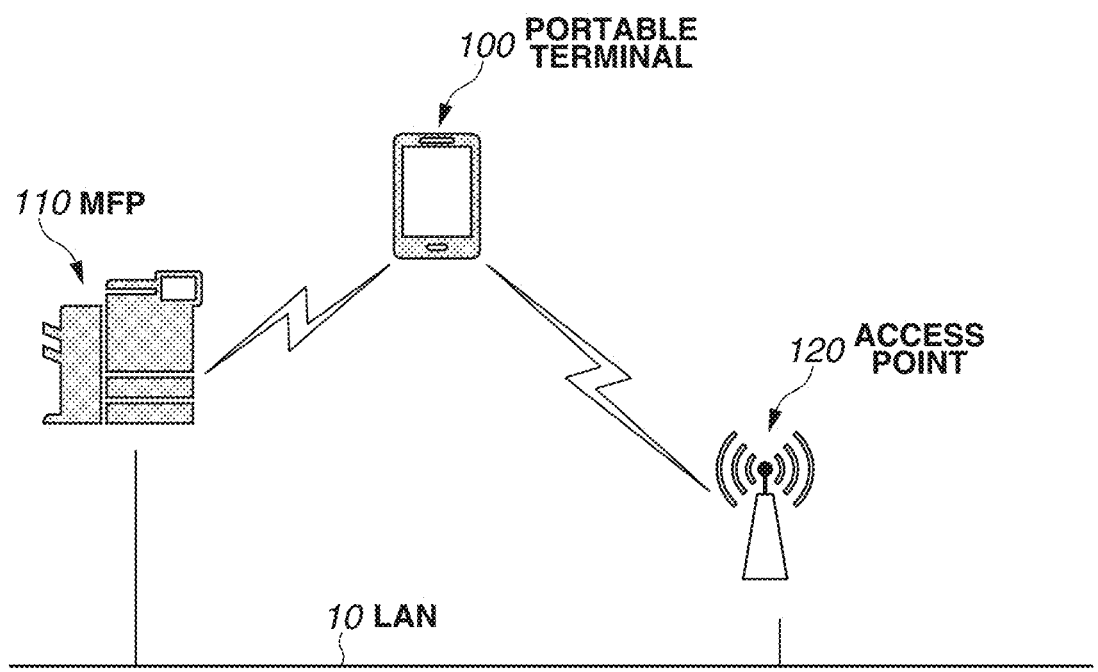
FIG. 1 is a diagram illustrating a system configuration according to a first exemplary embodiment.
Figure 2:
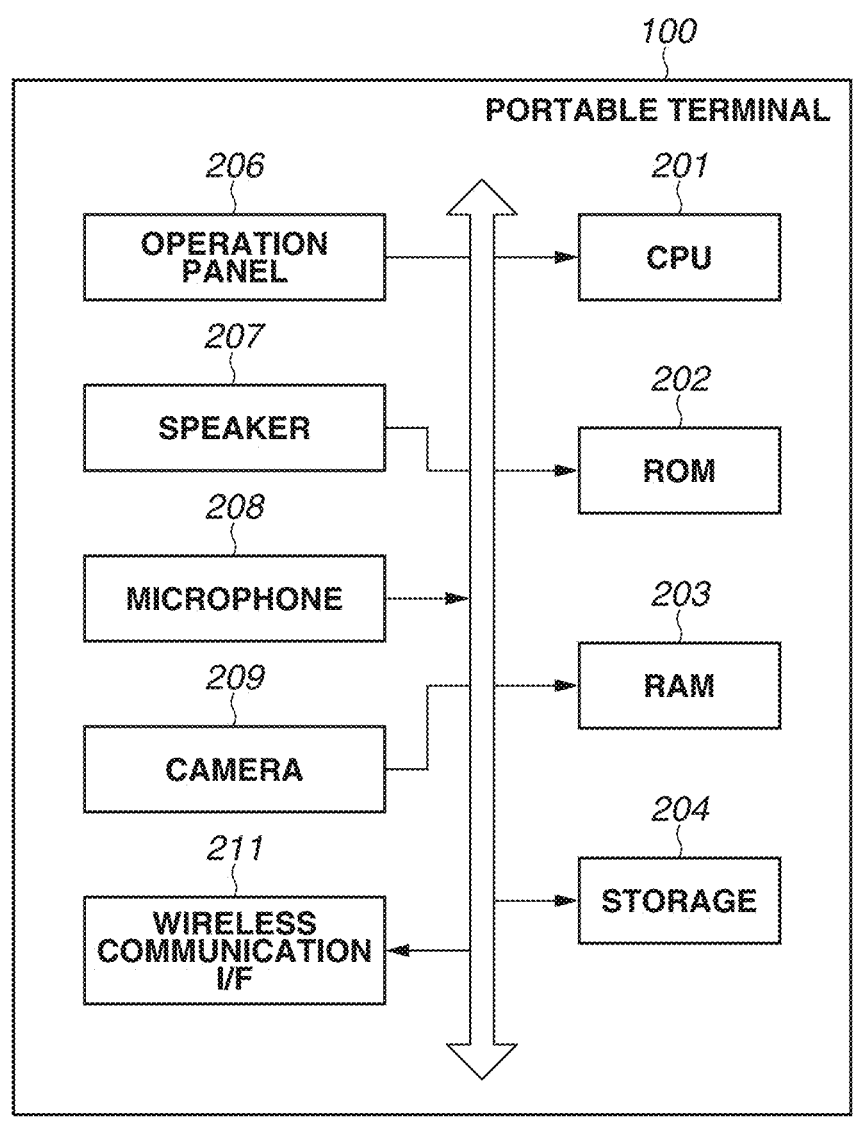
FIG. 2 is a block diagram illustrating a hardware configuration of a portable terminal according to the first exemplary embodiment.

Next, a hardware configuration of the portable terminal 100 will be described with reference to FIG. 2. The portable terminal 100 according to the present exemplary embodiment is assumed to be a smart phone or a tablet personal computer (PC), and may be other information processing apparatuses capable of communicating with the MFP 110.

A central processing unit (CPU) 201 reads a control program stored in a read only memory (ROM) 202 and executes various processing to control the operation of the portable terminal 100. The ROM 202 stores the control program. A random access memory (RAM) 203 is used as the main memory of the CPU 201 and a temporary storage area such as a work area. A storage 204 is, for example, an embedded Multi Media Card (eMMC), a Solid State Disk (SSD), or a Hard Disk Drive (HDD) that stores various data such as image data and electronic documents. An Operating System (OS) 350 (described below) and MFP application 300 is also stored in the storage 204. A Real Time Clock (RTC) 205 measures time.

Although, in the portable terminal 100, one CPU 201 performs each piece of processing illustrated in flowcharts (described below), other modes are also applicable. For example, it is possible that a plurality of CPUs collaborates to execute each piece of processing illustrated in the flowcharts (described below).

An operation panel 206 is provided with a touch panel function of detecting a touch operation of the user, and displays various screens provided by the OS 350 and the MFP application 300. The user can input a desired operation instruction to the portable terminal 100 by performing a touch operation on the operation panel 206.

A speaker 207 and a microphone 208 are used, for example, to make a phone call to other portable terminals and fixed-line phones. A camera 209 captures an image in response to an imaging instruction from the user. The image captured by the camera 209 is stored in a predetermined area of the storage 204. A wireless communication unit 211 performs wireless communication such as wireless local area network (LAN).

Figure 3:
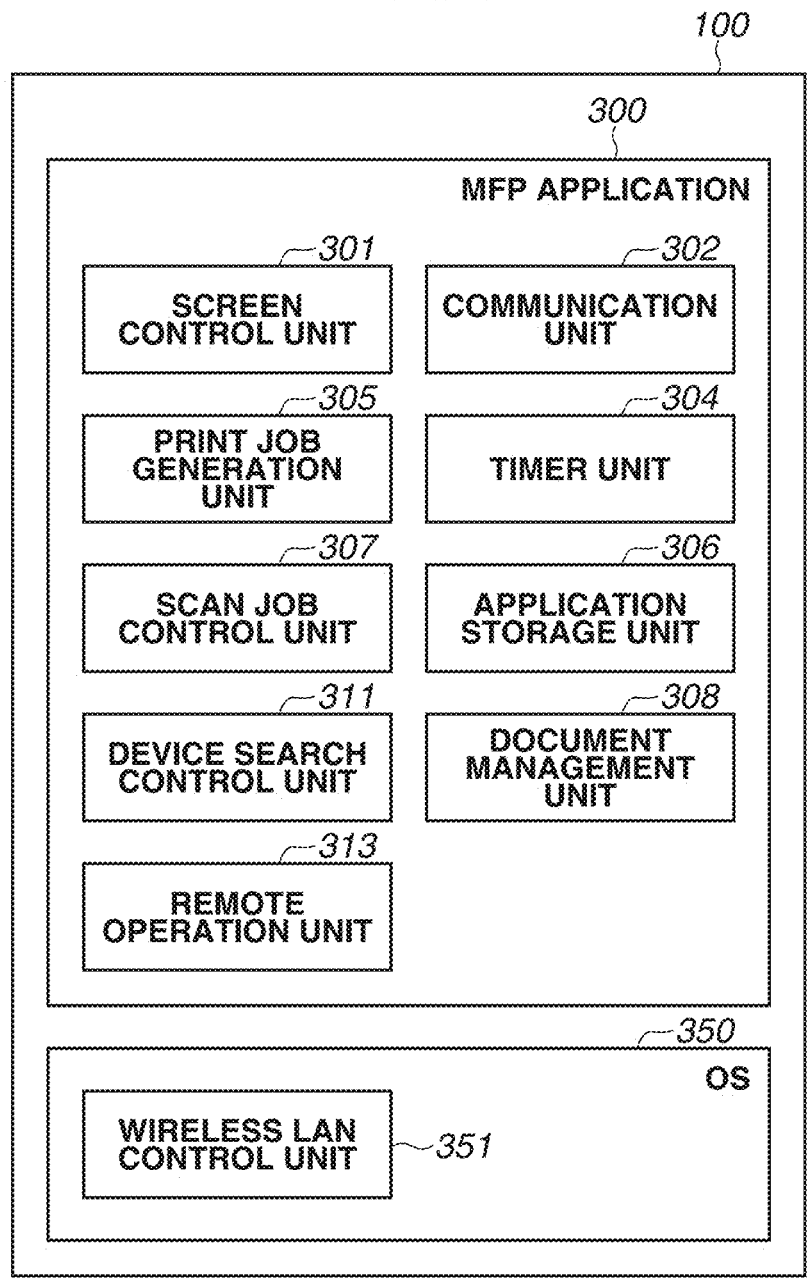
FIG. 3 is a block diagram illustrating a software configuration of the portable terminal according to the first exemplary embodiment.

Next, a software configuration of the portable terminal 100 will be described with reference to FIG. 3. FIG. 3 is block diagram illustrating software functions implemented by the CPU 201 reading a control program stored in the ROM 202 and the storage 204 and executing the control program.

The OS 350 is software that controls overall operations of the portable terminal 100. Various applications including the MFP application 300 (described below) can be installed in the portable terminal 100. The OS 350 exchanges information with these applications and changes the screen to be displayed on the operation panel 206 in response to instructions received from the applications. The OS 350 is provided with a device driver group for controlling various hardware components, and provides applications operating on the OS with Application Programming Interfaces (APIs) for using various hardware components. According to the present exemplary embodiment, for example, the device driver group is equivalent to a wireless LAN control unit 351. The wireless LAN control unit 351 is a device driver for controlling the wireless communication unit 211.

The MFP application 300 are applications installed in the portable terminal 100. The MFP application 300 can issue a print instruction and a scan instruction to the MFP 110. As described above, the portable terminal 100 operates as a VNC client and has a function of displaying the operation screen of the MFP 110 and remotely controlling the MFP 110. Various applications in addition to the MFP application 300 may be installed in the portable terminal 100. Descriptions of these applications will be omitted.

The configuration of the MFP application 300 will be described in more detail below. A screen control unit 301 controls the screen to be displayed on the operation panel 206 via the OS 350. The screen control unit 301 displays the screen of the MFP application on the operation panel 206. The screen control unit 301 receives an operation instruction input by the user via the operation panel 206. A communication unit 302 controls wireless communication by the wireless communication unit 211 via the OS 350 to transmit and receive information to/from the MFP 110 and other external apparatuses.

A device search control unit 311 generates search data used to search for external apparatuses connected with the portable terminal 100 and transmits the data to apparatuses on a LAN 10 via the wireless communication unit 211. Then, the device search control unit 311 receives a response from the external apparatuses that respond to the search. The search data may be broadcasted to all of the external apparatuses on the LAN 10 or transmitted to one external apparatus with address specification.

A print job generation unit 305 generates a print job. The print job generated by the print job generation unit 305 is transmitted to the MFP 110 by the wireless communication unit 211. The MFP 110 performs printing in response to the received print job.

A scan job control unit 307 transmits a scan instruction to the MFP 110 via the wireless communication unit 211. The MFP 110 performs scan in response to the instruction and transmits data (scan data) generated by scan to the portable terminal 100. The portable terminal 100 displays the received scan data. When the scan data is stored, it is stored in an application storage unit 306. The stored scan data is managed by a document management unit 308.

A remote operation unit 313 displays a screen based on the screen information acquired from the MFP 110 connected with the VNC link, and receives an operation performed on the displayed screen. In other words, the remote operation unit 313 operates as a VNC client. More specifically, the remote operation unit 313 displays a screen based on the screen information received from the VNC server, and transmits operation information including the position and type of the operation received on the displayed screen to the MFP 110. The MFP 110 changes the screen to be displayed on the MFP 110 and the screen currently displayed on the portable terminal 100, based on the received operation information. The application storage unit 306 temporarily stores various information generated by the MFP application 300. A timer unit 304 measures time.

Figure 4:
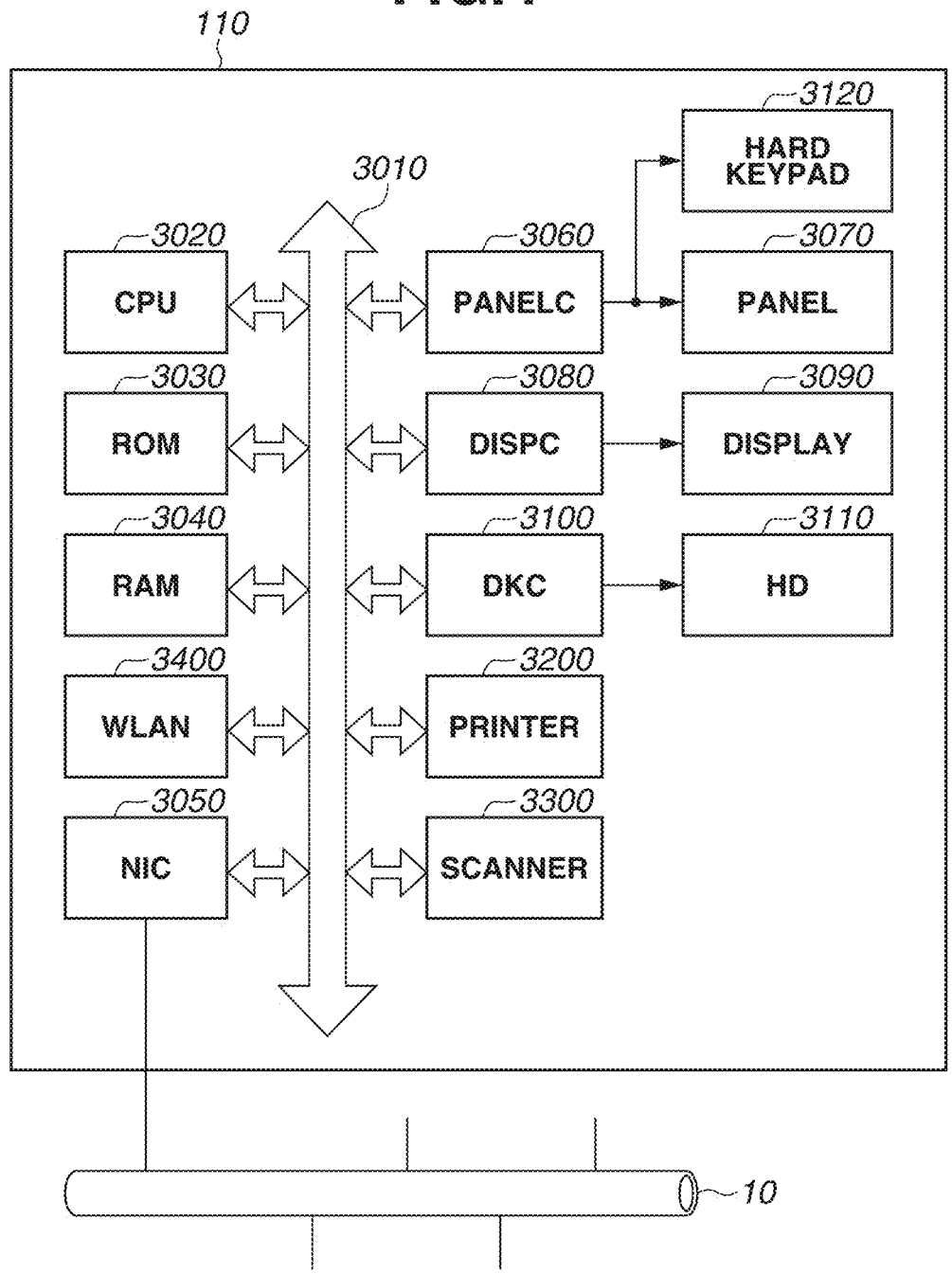
FIG. 4 is a block diagram illustrating a hardware configuration of a multifunction peripheral (MFP) according to the first exemplary embodiment.

FIG. 4 is a block diagram illustrating an example hardware configuration of the MFP 110. The MFP 110 includes a CPU 3020 that executes a program stored in a ROM 3030 or a large-scale storage device 3110 such as a hard disk. The CPU 3020 collectively controls devices connected to a system bus 3010.

A RAM 3040 functions as a main memory and a work area for the CPU 3020. A PANELC 3060 is an external input controller that controls instructions input from a hard keypad 3120 or a PANEL 3070 is a touch panel provided on a multifunction peripheral. A DISPC 3080 is a display controller that controls display of a DISPLAY 3090, which is a display module, including, for example, a liquid crystal display. A DKC 3100 is a disk controller for controlling the large-scale storage device (HD) 3110.

The operation unit of the MFP 110 will be described with reference to a screen 1000 in FIG. 10. A screen is displayed on the DISPLAY 3090, and the hard keypad 3120 is arranged next to the DISPLAY 3090. User operations can be received by both the PANEL (touch panel) 3070 on the DISPLAY 3090 and the hard keypad 3120. When the user presses a logout key 1001 on the hard keypad 3120 in a state where the user has logged in the MFP 110, this key instructs the MFP 110 to perform logout processing.

The hardware configuration of the MFP 110 100 in FIG. 4 will be described again. A Network Interface Card (NIC) 3050 performs bi-directional data exchange with an external apparatus (e.g., portable terminal 100) or a file server via a network 10. A WLAN 3400 is a wireless communication module for operating the MFP 110 as an access point to enable directly establishing a wireless communication link with the portable terminal 100 by connecting with an access point or operating in an access point mode. A printer 3200 is a printing unit that implements printing on paper by using the electrophotographic method. The printing method may not necessarily the electrophotographic method. A scanner 3300 is an image reading unit that reads an image printed on paper. In many cases, an automatic document feeder (ADF) (not illustrated) is attached to the scanner 3300 as an option to enable automatically reading a plurality of documents. In some cases, the HD 3110 may also be used to temporarily store images.

Figure 5:
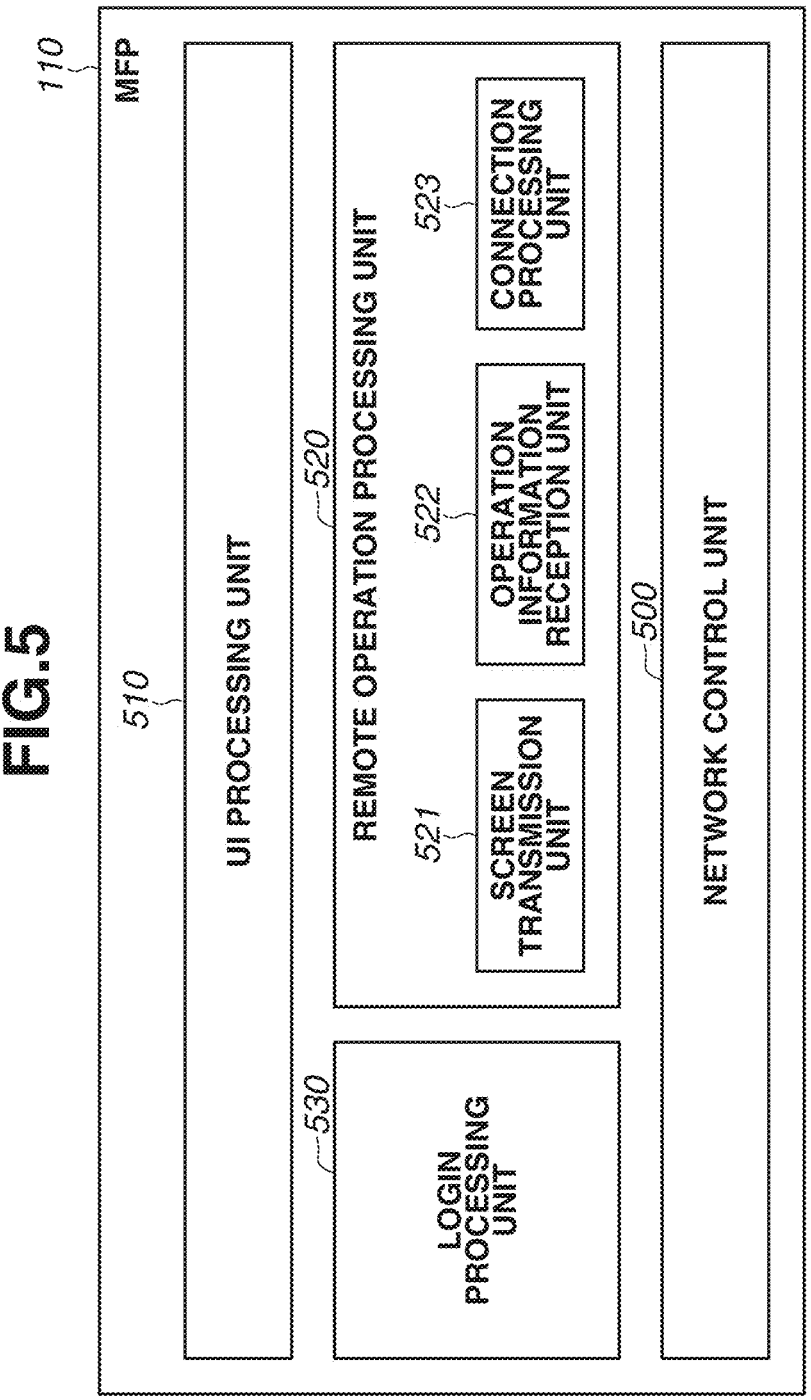
FIG. 5 is a block diagram illustrating a software configuration of the MFP according to the first exemplary embodiment.

FIG. 5 is a block diagram illustrating a software configuration of the MFP 110. For example, this software is stored in the ROM 3030 and executed by the CPU 3020.

A user interface (UI) processing unit 510 analyzes an input from the external input controller (PANELC) 3060 or operation information received from an operation information reception unit 522 (described below). When screen change is required, the UI processing unit 510 generates screen data and displays the data on the DISPLAY 3090.

Figure 10:
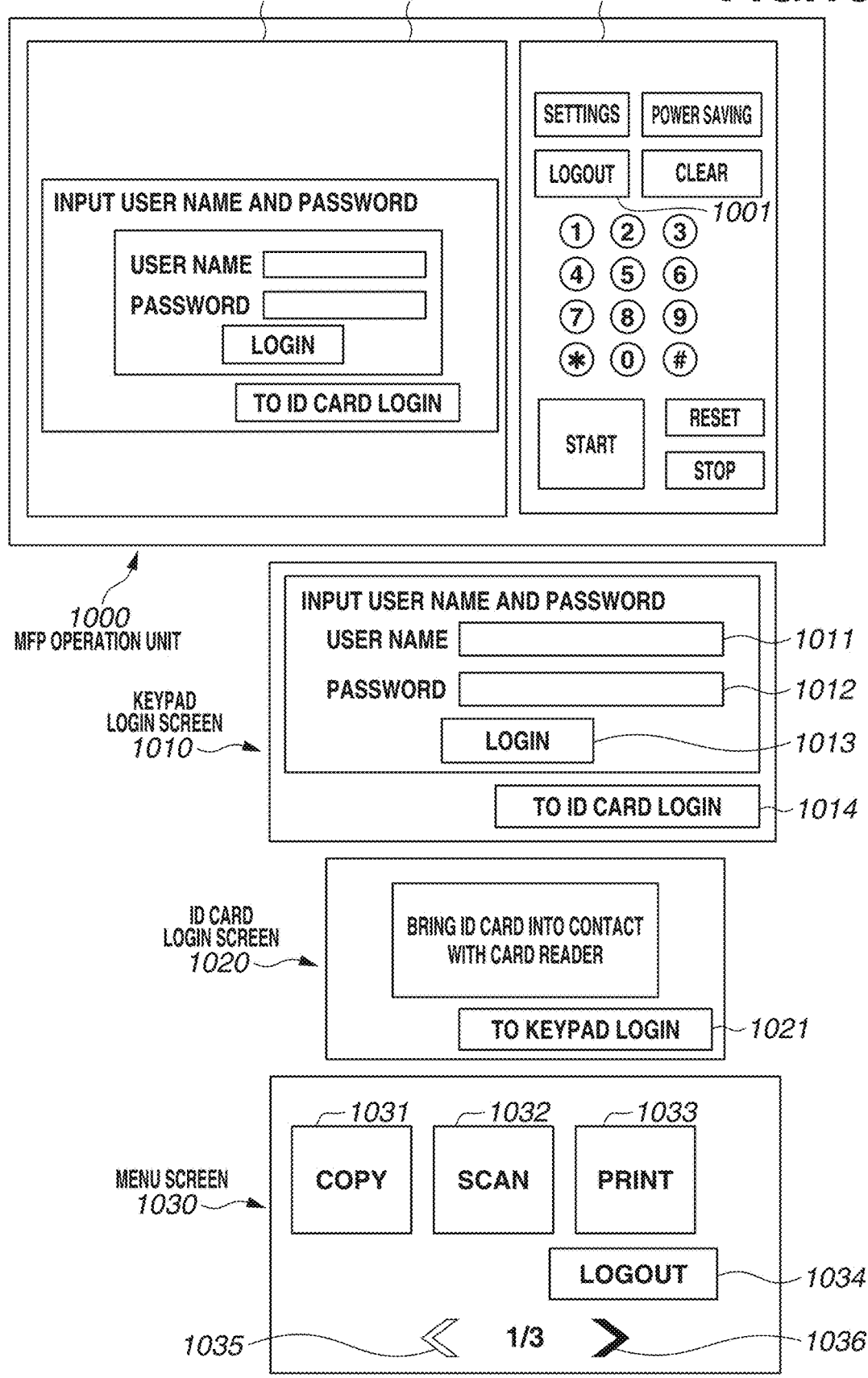
FIG. 10 illustrates UIs displayed on operation panels of the portable terminal and the MFP according to the first exemplary embodiment.

The DISPLAY 3090 displays various screens as illustrated in FIG. 10. Examples of screens displayed on the DISPLAY 3090 include an identification (ID) card login screen 1020, a keypad login screen 1010, a menu display screen 1030 displayed during a login operation, an error screen (not illustrated) displayed upon error occurrence, and a counter screen (not illustrated) displaying counter information. The DISPLAY 3090 is not displayed while the MFP 110 is in the sleep state.

The ID card login screen 1020 is used to log into the MFP 110 with an ID card associated with user information. When the user holds up the ID card over the ID card reader of the MFP 110 while this screen is displayed, the user information is read and login processing is performed. When the user presses a keypad login screen change (To Keypad Login) button 1021, the keypad login screen 1010 appears.

The keypad login screen 1010 is used to log into the MFP 110 by inputting the user information using the keypad 3120. When the user fills in a user name entry field 1011 and a password entry field 1012 by using the hard keypad 3120 or a soft keypad (not illustrated) and then presses a login button 1013, the MFP 110 performs the login processing. When the user presses an ID card login change (To ID Card Login) button 1014, the ID card login screen 1020 appears.

The menu display screen 1030 appears after the user logs into the MFP 110 via the keypad login screen 1010 or the ID card login screen 1020. The user can use various functions of the MFP 110 by pressing a copy button 1031, a scan button 1032, and a print button 1033 corresponding to the application. The menu screen includes a plurality of pages. When the user presses a logout button 1034, the MFP 110 performs logout processing. A next button 1036 changes the menu screen to the next page. A previous button 1035 changes the menu screen to the previous page. The page transition can also be performed through a drag or a flick operation.

A remote operation processing unit 520 includes a connection processing unit 523, an operation information reception unit 522, and a screen transmission unit 521. The remote operation processing unit 520 is a VNC server module that performs communication conforming to the RFB protocol, i.e., a software module that communicates with the portable terminal 100 operating as a VNC client, via a network. The connection processing unit 523 performs connection processing upon reception of a connection request from the MFP 110 and the portable terminal 100 as a VNC client, and performs disconnection processing upon reception of a disconnection request therefrom.

The operation information reception unit 522 receives screen operation information from the portable terminal 100 and the MFP 110, and notifies the UI processing unit 510 of the information. The screen transmission unit 521 is a display control unit that reads the screen data generated by the UI processing unit 510 from the RAM 3040 and transmits the screen data to the portable terminal 100 that is a VNC client to perform screen display control.

A login processing unit 530 is a module that performs login processing of the MFP 110. More specifically, the login processing unit 530 performs user authentication based on the user information received from the UI processing unit 510, and, upon successful completion of the user authentication, performs the login operation. Upon reception of a logout instruction from the UI processing unit 510, the login processing unit 530 performs the logout processing. A network control unit 500 is a module that controls the MC 3050. Other modules (not illustrated) include a printer module that controls the printer 3200 and a scanner module that controls the scanner 3300.

FIGS. 9A and 9B illustrate examples of a screen to be displayed on the operation panel 206 of the portable terminal 100. When the portable terminal 100 is activated, a home screen 910 appears. MFP application icons 911 are icons for activating the MFP application 300. When the user operates an MFP application icon 911, the corresponding MFP application 300 is activated.

When the MFP application 300 is activated, an application home screen 920 (no device selected yet) appears. A selected device icon 921 displays information about an MFP with which the MFP application 300 is currently communicating, and a job transmission target MFP (hereinafter, referred to as a target MFP). When no target MFP is set, "No Printer" is displayed. A device search button 923 is used to search for a target MFP. A remote operation button 922 is used to establish a VNC link to remotely control the target MFP. An application home screen 820 may display a print button 924 for transmitting a print job to the target MFP and a button for issuing a scan instruction.

When the user presses the device search button 923, MFPs existing in the network are searched and a device search screen 930 appears as search results. The device search screen 930 displays a list of MFPs that have responded to the search. For example, the target MFP is selected when the user selects a search result 931 as one of the search results.

When the target MFP is selected, an application home screen 940 (device selected) appears. The selected device icon 921 displays information about the MFP selected in the device search screen 930. When the user taps the remote operation button 922 while the target MFP is currently selected, the remote control function of the target MFP is activated. The following description will be given on the premise that the target MFP is the MFP 110.

When the remote control function is activated, a device connection screen 950 appears. When the user presses a hard keypad display button 951, an UI for operating the hard keypad 3120 of the MFP 110 appears. Details will be described below.

When a VNC link is established and the remote control function is enabled, the screen displayed on the DISPLAY 3090 of the MFP 110 appears on the operation panel 206. In this case, a keypad login screen 960 identical to the keypad login screen 1010 appears. The keypad login screen 960 displays the same contents as the keypad login screen 1010 of the MFP 110 except that the hard keypad display button 951 is displayed on the operation panel 206, and descriptions thereof will be omitted. When the MFP 110 currently displays the ID card login screen 1020, an ID card login screen 965 appears.

When a login instruction is issued via the keypad login screen 960, a menu display screen 970 (hard keypad not displayed) identical to the menu display screen 1030 appears. The menu display screen 1030 is also displayed on the DISPLAY 3090.

When the user taps the hard keypad display button 951, a menu display screen 975 (hard keypad displayed) appears. More specifically, a software keypad, in which a piece of processing is assigned each of the hard keypad 3120 of the MFP 110 appears. A hard keypad UI 977 is a UI for operating the hard keypad 3120 of the MFP 110. When the user taps the button displayed on the hard keypad UI 977, key information for the pressed key is transmitted to the MFP 110. The MFP 110 performs processing based on the pressed key. When the user presses the logout key 979 corresponding to the logout key 1001 of the MFP 110, the user logs out of the MFP 110. When the user taps an end button 978 at the top of the hard keypad UI 977, the remote control function ends, i.e., the VNC link ends. When the VNC link ends, the application home screen 940 (device selected) appears on the operation panel 206. When the VNC link is ended, the screen displayed before ending the VNC link is kept being displayed on the DISPLAY 3090.

Figure 11:
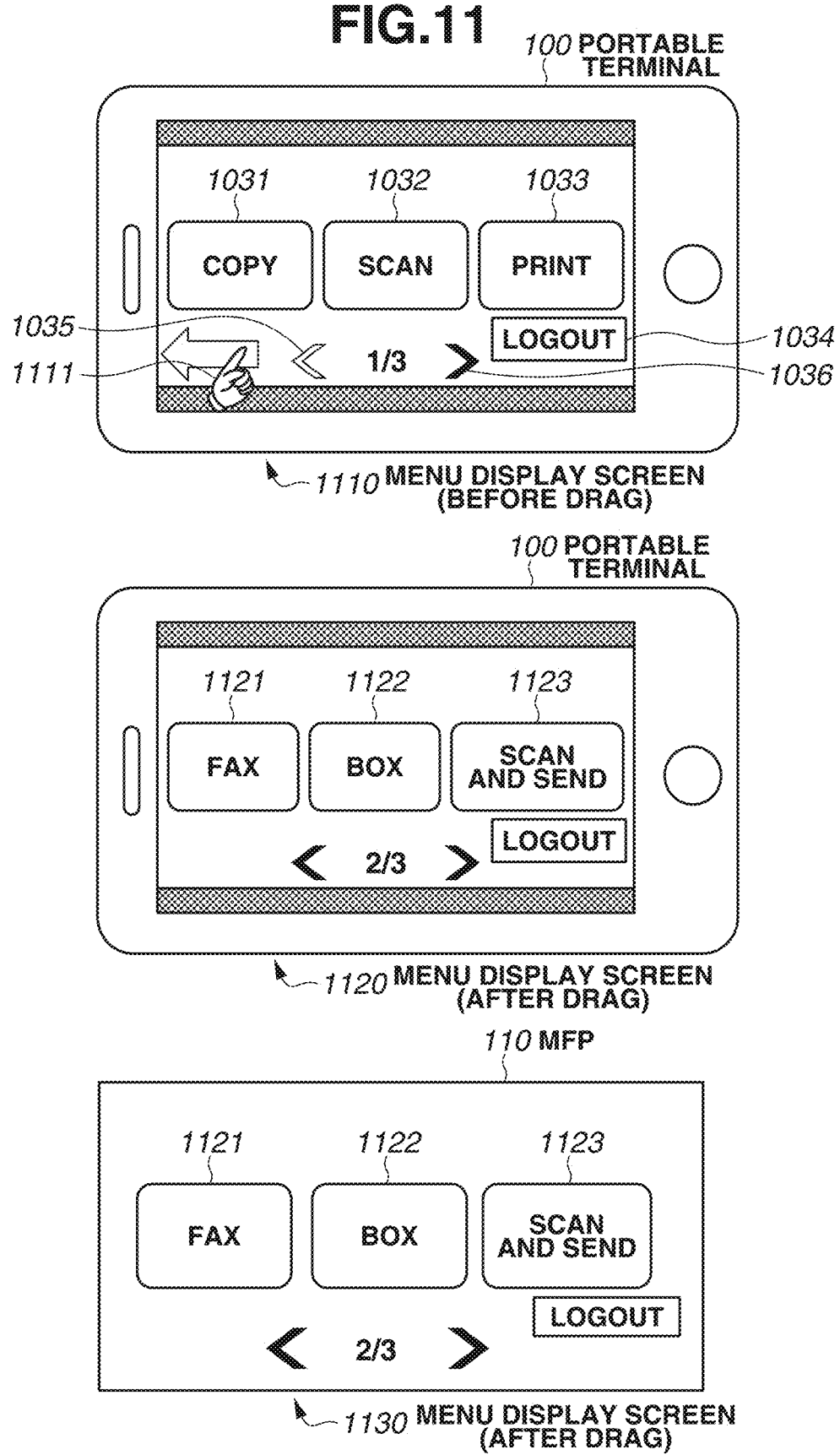
FIG. 11 illustrates UIs displayed on the operation panels of the portable terminal and the MFP according to the second exemplary embodiment.

FIG. 11 illustrates example screens of the portable terminal 100 and the MFP 110 when the user performs a drag operation while the portable terminal 100 displays the menu display screen 970. A menu display screen 1110 (before drag) is displayed on the portable terminal 100 based on the screen information transmitted from the MFP 110. The menu display screen 1110 (before drag) is the default state screen that is not enlarged so that the full screen is displayed based on the screen information received from the MFP 110. In this state (default screen state), the screen transmitted from the MFP 110 is displayed as it is so that the screen size fits into the horizontal and vertical lengths of the operation panel 206 of the portable terminal 100.

When the user performs a drag operation 1111 on the menu display screen 1110 (before drag), the portable terminal 100 transmits the operation information indicating the drag operation to the MFP 110 and displays a menu display screen 1120 (after drag) as the menu screen of the next page. At this time, the MFP 110 also displays a menu screen 1130 (after drag) as the next page based on the operation information received from the portable terminal 100. The menu display screen 1120 (after drag) displays a fax button 1121, a BOX button 1122, and a scan and send button 1123. When the user presses each button, the screen of the corresponding processing appears. Likewise, upon reception of a drag operation on the MFP 110 while the menu display screen 1030 is displayed on the MFP 110, the portable terminal 100 displays a menu display screen 1120 (after drag), and the MFP 110 displays the menu screen 1130 (after drag). In this case, a drag operation is assigned to the processing for making a page transition upon reception of a drag operation from the user while the MFP 110 displays the menu display screen 1030. Accordingly, also upon reception of a drag operation on the portable terminal 100 while the MFP 110 is remotely controlled on the portable terminal 100, page transition can be performed.

Figure 12:
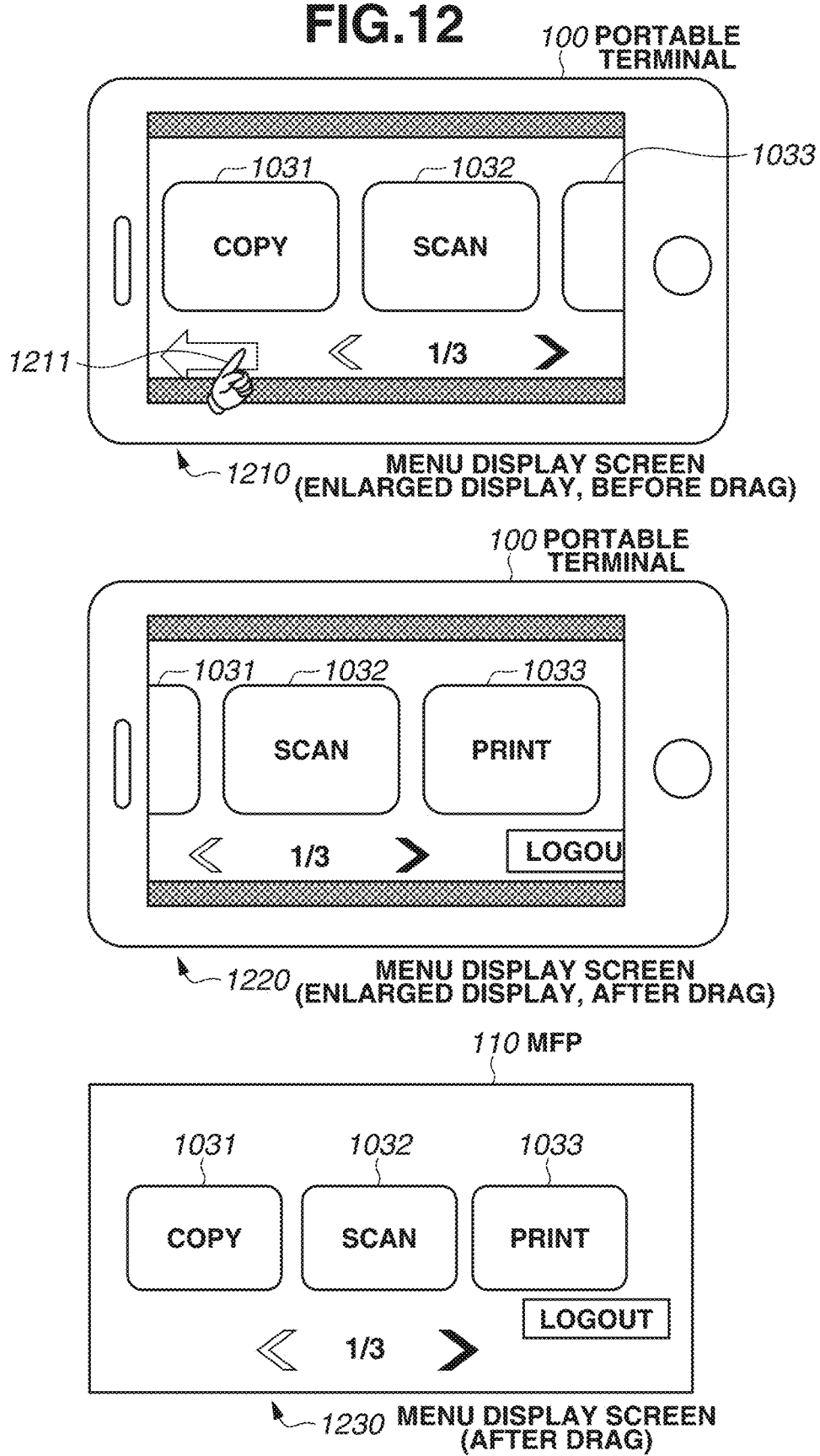
FIG. 12 is a diagram illustrating UIs displayed on the operation panels of the portable terminal and the MFP according to the first exemplary embodiment.

FIG. 12 illustrate screens of the portable terminal 100 and the MFP 110 when a drag operation is performed while the menu display screen 970 is enlarged on the portable terminal 100.

A menu display screen 1210 (enlarged display, before drag) appears on the portable terminal 100 upon reception of a screen enlargement operation, such as a pinch-out and a double-tap, from the user on the portable terminal 100 displaying the menu display screen 1110 (before drag). Screen enlargement operation information is not transmitted from the portable terminal 100 to the MFP 110. This is because, on the MFP 110, a drag operation is not assigned to the processing for enlarging the screen while the menu display screen 1030 is displayed. Thus, upon reception of a screen enlargement operation from the user on the portable terminal 100 displaying the menu display screen 1110 (before drag), the portable terminal 100 displays the enlarged menu display screen 1210 and the MFP 110 displays the non-enlarged menu display screen 1030.

Upon reception of a drag operation 1211 from the user on the menu display screen 1210 (enlarged display, before drag), the portable terminal 100 displays a menu display screen 1220 (enlarged display, after drag) after a moving operation in the enlarged display region. At this time, the portable terminal 100 does not transmit the operation information about the drag operation 1211 to the MFP 110. As a result, the MFP 110 keeps displaying the menu screen 1230 (after drag) like the menu display screen 1030. If the user performs a drag operation while the menu screen is enlarged on the portable terminal 100, the user wants to move the enlarged display region in the dragging direction. Thus, the portable terminal 100 does not transmit the operation information to the MFP 110 but perform processing for changing the display region on the portable terminal 100 itself. When the portable terminal 100 receives a drag operation from the user while the menu screen is enlarged, and then transmits the operation information about the drag operation to the MFP 110, the MFP 110 performs page transition on the menu screen since a drag operation is assigned to the processing for making a page transition. Accordingly, the MFP 110 will perform processing different from the user's intention. For this reason, when the portable terminal 100 receives a page transition operation such as a drag operation while the screen is enlarged, the portable terminal 100 itself changes the screen display without transmitting the operation information to the MFP 110, thereby enabling processing according to the user's intention. Even while the portable terminal 100 displays an enlarged screen, pressing the positions corresponding to the previous button 1035 and the next button 1036 on the portable terminal 100 enables performing page transition.

Figure 6:
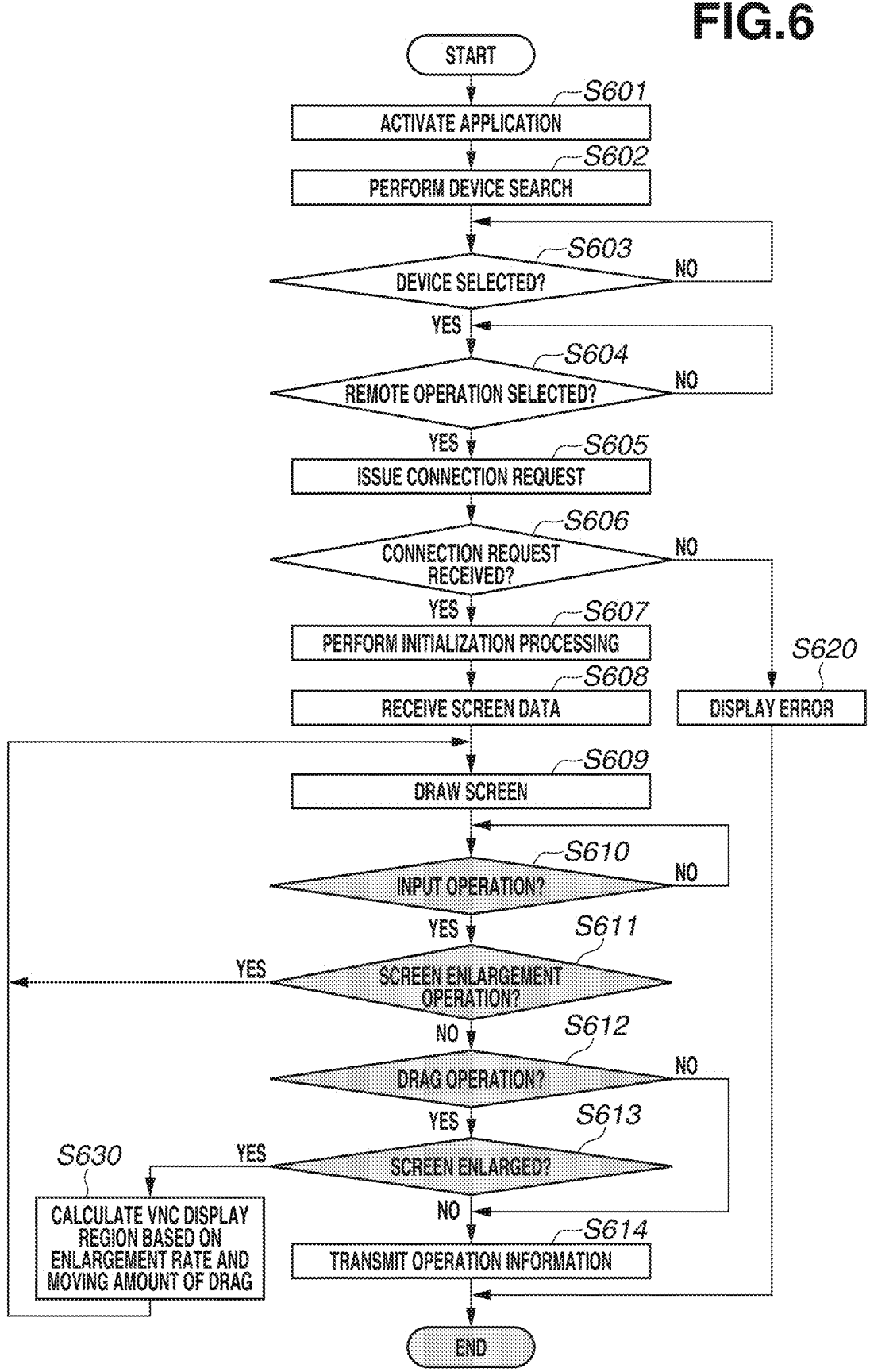
FIG. 6 is a flowchart illustrating processing of the portable terminal according to the first exemplary embodiment.

FIG. 6 is a flowchart illustrating processing when the portable terminal 100 establishes a VNC link with the MFP 110 and the user performs remote control. Each step illustrated in the flowchart in FIG. 6 is implemented when the CPU 201 loads a control program stored in a memory such as the ROM 202 into the RAM 203, and then executes the control program.

When the CPU 201 detects that an MFP application icon 911 is tapped on the home screen 910, then in step S601, the CPU 201 activates the corresponding MFP application 300. In step S602, the screen control unit 301 detects that the device search button 923 is tapped on the application home screen 920 (no device selected), the CPU 201 performs MFP search. In step S603, the CPU 201 determines whether the MFP is selected on the device search screen 930. When the MFP is selected (YES in step S603), the CPU 201 makes a screen transition to the application home screen (device selected) 940, and the processing proceeds to step S604. On the other hand, when the MFP is not selected (NO in step S603), the processing repeats the processing in step S603.

In step S604, the CPU 201 determines whether the remote operation button 922 is selected in the application home screen 940 (device selected). When the remote operation button 922 is selected (YES in step S604), the processing proceeds to step S605. On the other hand, when the remote operation button 922 is not selected (NO in step S604), the processing repeats the processing in step S604.

In step S605, the CPU 201 issues a connection request conforming to the RFB protocol to the MFP selected in step S604. In step S606, the CPU 201 determines whether the connection request is received. When the connection request is received (YES in step S606), the processing proceeds to step S607. On the other hand, when the connection request is not received (NO in step S606), the processing proceeds to step S620. The CPU 201 determines whether the connection request is received based on response data for the connection request. In step S620, the screen control unit 301 displays a connection rejection error screen 980, and the CPU 201 ends the processing.

In step S607, the CPU 201 performs initialization processing conforming to the RFB protocol. In the initialization processing, the remote operation unit 313 transmits VNC client information and receives VNC server information.

In step S608, the remote operation unit 313 receives the screen information transmitted from the MFP 110 i.e., a VNC server. In step S609, the screen control unit 301 draws a screen on the operation panel 206 based on the received screen information and the screen information generated by the screen control unit 301. For example, when the keypad login screen 1010 is displayed on the DISPLAY 3090, the keypad login screen 960 is displayed on the operation panel 206. Each time the screen information is transmitted from the MFP 110, the CPU 201 successively displays a screen in step S609.

In step S610, the remote operation unit 313 determines whether an input operation is received from the operation panel 206. When an input operation is received (YES in step S610), the processing proceeds to step S611. On the other hand, when no input operation is received (NO in step S610), the processing repeats the processing in step S610.

In step S611, the screen control unit 301 determines whether the operation received in step S610 is a screen enlargement operation. Examples of screen enlargement operations include a pinch-out and a double-tap. When the received operation is determined to be a screen enlargement operation (YES in step S611), the CPU 201 does not transmit the operation information to the MFP 110 and the processing returns to step S609. In step S609, the screen control unit 301 displays the enlarged screen. On the other hand, when the received operation is determined not to be a screen enlargement operation (NO in step S611), the processing proceeds to step S612.

In step S612, the screen control unit 301 determines whether the operation received in step S610 is a drag operation. When the received operation is determined to be a drag operation (YES in step S612), the processing proceeds to step S613. On the other hand, when the received operation is determined not to be a drag operation (NO in step S612), the processing proceeds to step S614. In step S613, the CPU 201 determines whether the screen displayed on the operation panel 206 is in an enlarged form. When the screen is determined to be in an enlarged form (YES in step S613), the processing proceeds to step S630. On the other hand, when the screen is determined not to be in an enlarged form (NO in step S613), the processing proceeds to step S614. For example, when the menu display screen 1210 is displayed on the operation panel 206, the screen is determined to be enlarged. More specifically, in this case, the CPU 201 determines whether the screen received from the MFP 110 is enlarged from the default state where the screen is displayed as it is. In step S630, the screen control unit 301 calculates the display region based on the current enlargement rate (enlargement rate corresponding to the default screen display form) and the moving amount of the received drag operation. In step S609, the screen control unit 301 displays a screen with the changed region to be enlarged. At this time, the operation information indicating the drag operation is not transmitted to the MFP 110.

In step S614, the remote operation unit 313 transmits the operation information corresponding to the operation received in step S610 to the MFP 110. When the operation received in step S610 is a remote control end operation, i.e., a VNC link end operation, the remote operation unit 313 transmits a VNC link disconnection request to the MFP 110.

According to the above-described flowchart, even when a drag operation is received on the portable terminal 100 while the screen is enlarged on the portable terminal 100 in a case where the MFP 110 is remotely controlled from the portable terminal 100, the portable terminal 100 does not transmit the operation information about the drag operation to the MFP 110. This enables preventing a page transition not intended by the user from being performed.

When the screen is determined to be in an enlarged form when a drag operation is received (YES in step S613), the processing proceeds to step S630. In step S630, the screen display is changed only on the portable terminal 100. On the other hand, when the screen is determined not to be in an enlarged form (NO in step S613), the processing proceeds to step S614. In step S614, the portable terminal 100 transmits the operation information indicating the drag operation to the MFP 110. In other words, the portable terminal 100 selects whether to transmit the operation information to the MFP 110 according to whether the screen is enlarged. However, this control is not limited to the determination whether the screen is enlarged. For example, the portable terminal 100 may select whether to transmit the operation information to the MFP 110 according to whether the screen displayed based on the screen information transmitted from the MFP 110 is currently reduced in size. In other words, the portable terminal 100 selects whether to transmit the operation information to the MFP 110 based on the state of the display screen on the portable terminal 100.

Although, in the above-described example, the portable terminal 100 does not transmit the operation information to the MFP 110 upon reception of a screen enlargement operation, the portable terminal 100 may transmit the operation information. In this case, since the MFP 110 has the received operation information no processing corresponding to the received operation information, the MFP 110 invalidates the operation information without processing the operation information. In the above-described example, upon reception of a screen enlargement operation on the portable terminal 100 in step S611, only the portable terminal 100 displays the enlarged screen without transmitting the operation information to the MFP 110. However, the processing is not limited to a screen enlargement operation. Similarly, upon reception of a screen reduction operation such as a pinch-in, the portable terminal 100 may display the reduced screen without transmitting the operation information to the MFP 110.

Although a drag operation has been described above as an example of a page transition operation, examples of page transition operations may include a flick, a swipe, and other operations for moving an indication object.

Figure 7:
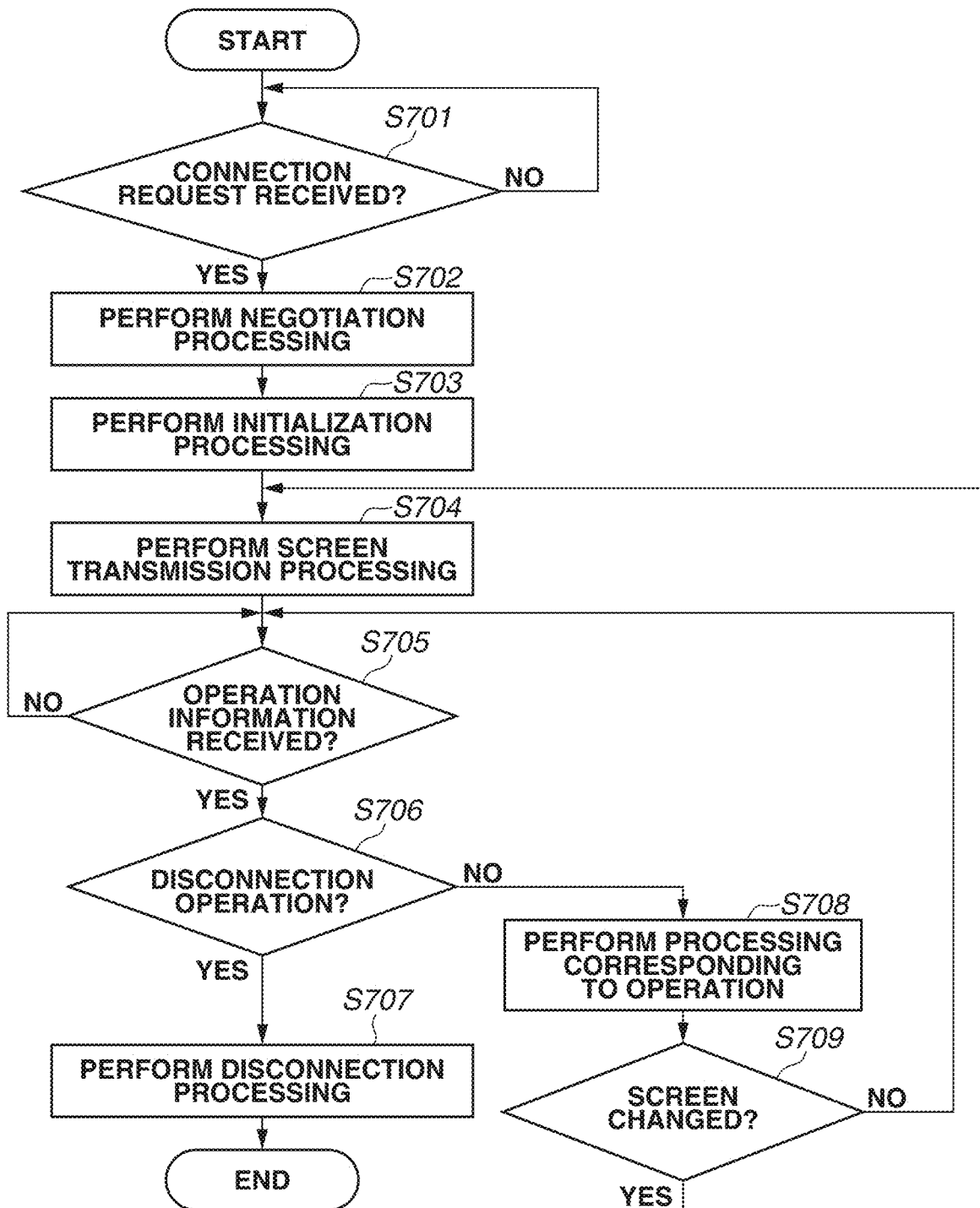
FIG. 7 is a flowchart illustrating processing of the MFP according to the first exemplary embodiment.

FIG. 7 illustrates processing of the MFP 110 when the MFP 110 performs VNC-based screen association with the portable terminal 100. Each step illustrated in a flowchart in FIG. 7 is implemented when the CPU 3020 loads a control program stored in a memory such as the ROM 3030 into the RAM 3040, and then executes the control program.

In step S701, the connection processing unit 523 determines whether a VNC link request is received from the portable terminal 100 that is a VNC client. When a VNC link request is received (YES in step S701), the processing proceeds to step S702. On the other hand, when a VNC link request is not received (NO in step S701), the processing repeats the processing in step S701. In step S702, the connection processing unit 523 performs negotiation processing to connect with the VNC client. In step S703, the connection processing unit 523 performs the initialization processing, receives client information, and transmits server information.

In step S704, the screen transmission unit 521 transmits the screen currently displayed on the DISPLAY 3090 to the portable terminal 100 that is a VNC client.

In step S705, the operation information reception unit 522 determines whether an operation is received from the user. When an operation is received (YES in step S705), the processing proceeds to step S706. On the other hand, when no operation is received (NO in step S705), the processing repeats the processing in step S705. For example, when the operation information is received from the portable terminal 100 or when a user operation is detected on the PANEL 3070 or the hard keypad 3120 of the MFP 110, the CPU 3020 determines that an operation is received from the user.

In step S706, the CPU 3020 determines whether the operation received in step S705 is a VNC link disconnection operation. When the received operation is determined to be a VNC link disconnection operation (YES in step S706), the processing proceeds to step S707. In step S707, the CPU 3020 disconnects the VNC link. On the other hand, when the received operation is determined to be not a VNC link disconnection operation (NO in step S706), the processing proceeds to step S708.

In step S708, the CPU 3020 performs processing corresponding to the operation received in step S705. Examples of corresponding processing include processing for changing the menu screen displayed on the DISPLAY 3090 to the next page, processing for logging into the MFP 110, and processing for logging out of the MFP 110. In step S709, the operation information reception unit 522 determines whether the screen to be displayed on the DISPLAY 3090 is changed based on the processing performed in step S708. When the screen is changed (YES in step S709), the processing returns to step S704. On the other hand, when the screen remains unchanged (NO in step S709), the processing returns to step S705.

By the above-described processing, the screen displayed on the MFP 110 can also be displayed on the portable terminal 100. The CPU 3020 can change the screens to be displayed on the MFP 110 and the portable terminal 100 in response to the operation received on the MFP 110 or the portable terminal 100. In the above-described flowchart, the screen to be displayed on the portable terminal 100 is changed in response to the operation received by the MFP 110 or the portable terminal 100. If the MFP 110 and the portable terminal 100 receive no operation, and the screen to be displayed by the MFP 110 is changed, the MFP 110 similarly transmits the changed screen information to the portable terminal 100, and the portable terminal 100 displays the changed screen.

Assume a case where the portable terminal 100 displays a screen based on the screen information transmitted from the MFP 110 to remotely control the MFP 110 on the portable terminal 100. In this case, according to the above-described exemplary embodiment, when the portable terminal 100 receives a predetermined page transition operation such as a drag operation while the portable terminal 100 does not display the screen received from the MFP 110 as it is (e.g., while the screen is enlarged), the portable terminal 100 can be prevented from transmitting the operation information to the MFP 110. If the portable terminal 100 transmits the received operation information to the MFP 110 while the portable terminal 100 does not display the screen received from the MFP 110 as it is, the MFP 110 may possibly perform processing not intended by the user. For example, if the portable terminal 100 receives a drag operation while the portable terminal 100 enlarges the screen received from the MFP 110 and then transmits information about the drag operation to the MFP 110, a page transition will occur. In this case, the user intends to move the display region with a drag operation. Thus, if the portable terminal 100 transmits the operation information to the MFP 110, the MFP 110 will perform processing different from the user's intention. The present exemplary embodiment enables preventing processing different from the user's intention from being performed.

According to the above-described exemplary embodiment, the portable terminal 100 determines whether to transmit the operation information to the MFP 110 based on the screen status of the portable terminal 100 itself. The present disclosure is not limited thereto. The MFP 110 may grasp the display form of the portable terminal 100. In this case, upon reception of the operation information from the portable terminal 100, the MFP 110 may determine whether to perform processing in consideration of the display form of the portable terminal 100, and select processing.

The first exemplary embodiment has been described above centering on an example where, even upon reception of a page transition operation such as a drag operation while the screen on the portable terminal 100 is enlarged, the portable terminal 100 does not transmit the operation information about the operation to the MFP 110. However, the portable terminal 100 may transmit the operation information about an operation such as a tap and a pressing to the MFP 110 even while the screen is enlarged on the portable terminal 100. A second exemplary embodiment will be described centering on an example where the portable terminal 100 receives an operation such as a tap and a pressing and transmits the operation information to the MFP 110 even while the screen is enlarged on the portable terminal 100. The basic configuration of the second exemplary embodiment is similar to that of the first exemplary embodiment, and only differences will be described.

Figure 8:
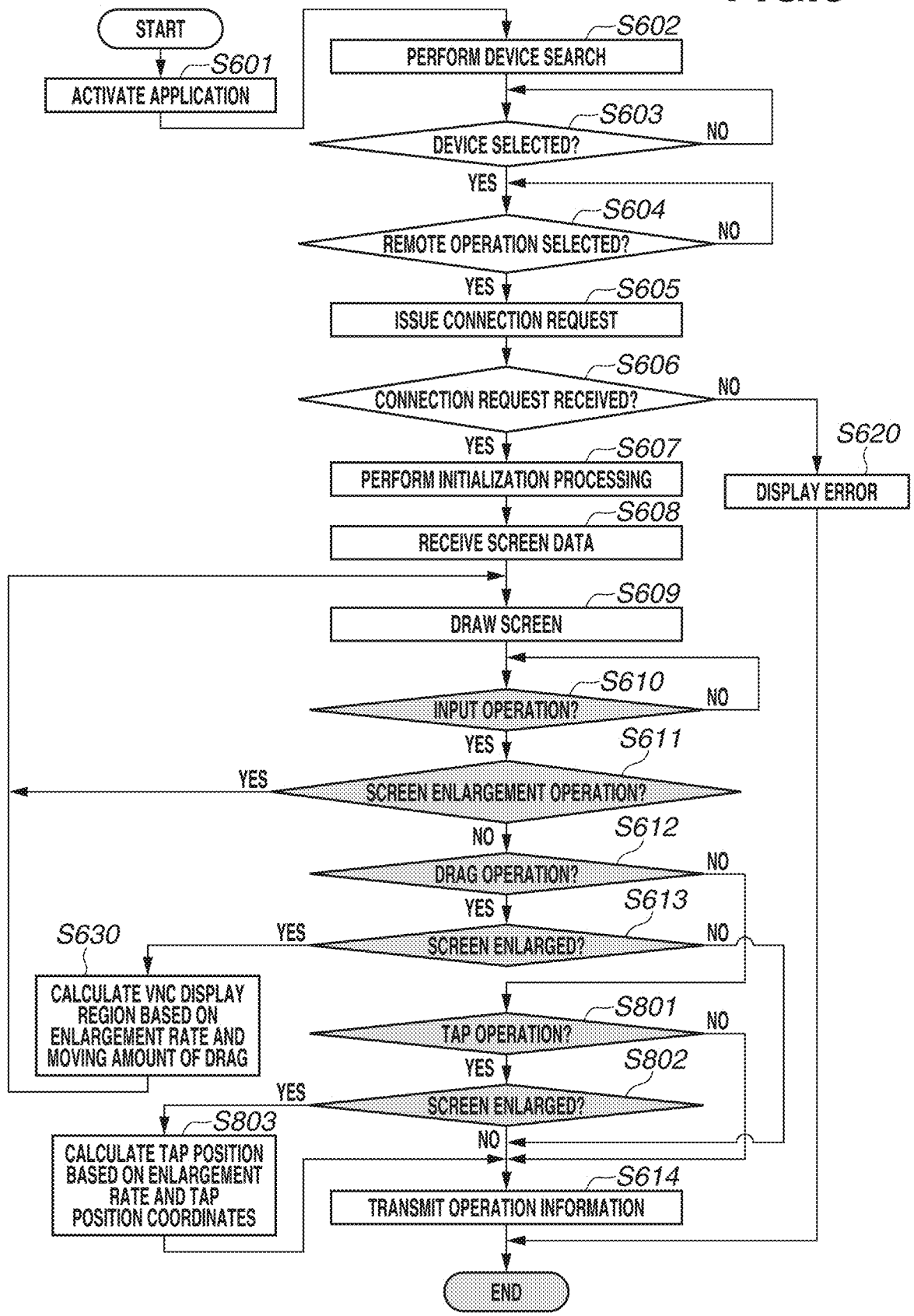
FIG. 8 is a flowchart illustrating another processing of the portable terminal according to a second exemplary embodiment.

FIG. 8 is a flowchart illustrating processing of the portable terminal 100 according to the present exemplary embodiment. The basic configuration of the flowchart in FIG. 8 is similar to that of the flowchart in FIG. 6 according to the first exemplary embodiment, and only differences will be described below.

In step S801, the screen control unit 301 determines whether the operation received in step S610 is a tap operation. When the received operation is determined to be a tap operation (YES in step S801), the processing proceeds to step S802. In step S802, the screen control unit 301 determines whether the screen is currently enlarged. On the other hand, when the received operation is determined not to be a tap operation (NO in step S801), the processing proceeds to step S614.

When the screen is determined to be currently enlarged (YES in step S802), the processing proceeds to step S803. In step S803, the screen control unit 301 calculates the tap position based on the current enlargement rate of the screen, the enlarged position, and the tapped position information. In step S614, the screen control unit 301 transmits the operation information about the calculated position coordinates to the MFP 110. The screen control unit 301 derives a position on the screen before the enlargement corresponding to the received tap position, based on the current enlargement rate of the screen, the enlarged position, and the tapped position information, and transmits a result of the derivation to the MFP 110.

The above-described exemplary embodiment enables the portable terminal 100 to receive an operation such as a tap even while the screen is enlarged, and correctly notify the MFP 110 of the operation information for the operation. In other words, when the user presses the position of the copy button 1031 on the menu display screen 1210 in FIG. 12 that is an enlarged display screen, the portable terminal 100 notifies the MFP 110 of the pressing of the copy button 1031 and makes a screen transition to a copy display screen (after tap) 1320.

The first exemplary embodiment has been described above centering on a method performed by the portable terminal 100 to select whether to transmit the operation information indicating a drag operation to the MFP 110 based on the enlarged status of the screen. However, in addition, the portable terminal 100 may select whether to transmit the operation information to the MFP 110 abased on the display form of the screen of the portable terminal 100. For example, like the menu display screen 975 (hard keypad displayed), when the user presses the copy button 1031 on the screen received from the MFP 110 while the portable terminal 100 displays a soft keypad, the portable terminal 100 is prevented from transmitting the operation information about the pressing to the MFP 110. More specifically, in the following example, the portable terminal 100 controls whether to transmit the operation information about a user operation made on the screen received from the MFP 110, to the MFP 110 according to whether the portable terminal 100 currently displays the hard keypad UI 977. Description will be made centering on an example form in which the hard keypad UI 977 is hidden when the user taps, for example, a region other than the hard keypad UI 977 while the portable terminal 100 displays the hard keypad UI 977. If the user taps a region other than the hard keypad UI 977 to hide the hard keypad UI 977, and information about the tap is transmitted to the MFP 110, processing different from the user's intention will be performed. The basic configuration of the third exemplary embodiment is similar to that of the first exemplary embodiment, and only differences will be described below.

FIG. 13 illustrates screens displayed on the portable terminal 100 and the MFP 110 when a tap operation is received while the portable terminal 100 displays the menu display screen 970 (hard keypad not displayed). When the user performs a tap operation 1311 on the copy button 1031 on a menu display screen 1310 (before tap) that does not currently display the hard keypad UI 977, the portable terminal 100 displays the copy display screen 1320 (after tap). At this time, the portable terminal 100 transmits the operation information about the tap operation 1311 to the MFP 110. The MFP 110 makes a screen transition of the DISPLAY 3090 to a copy display screen 1330 (after tap) based on the received operation information, and transmits the screen information to the portable terminal 100. Then, the portable terminal 100 displays the copy display screen 1320 (after tap).

Figure 14:
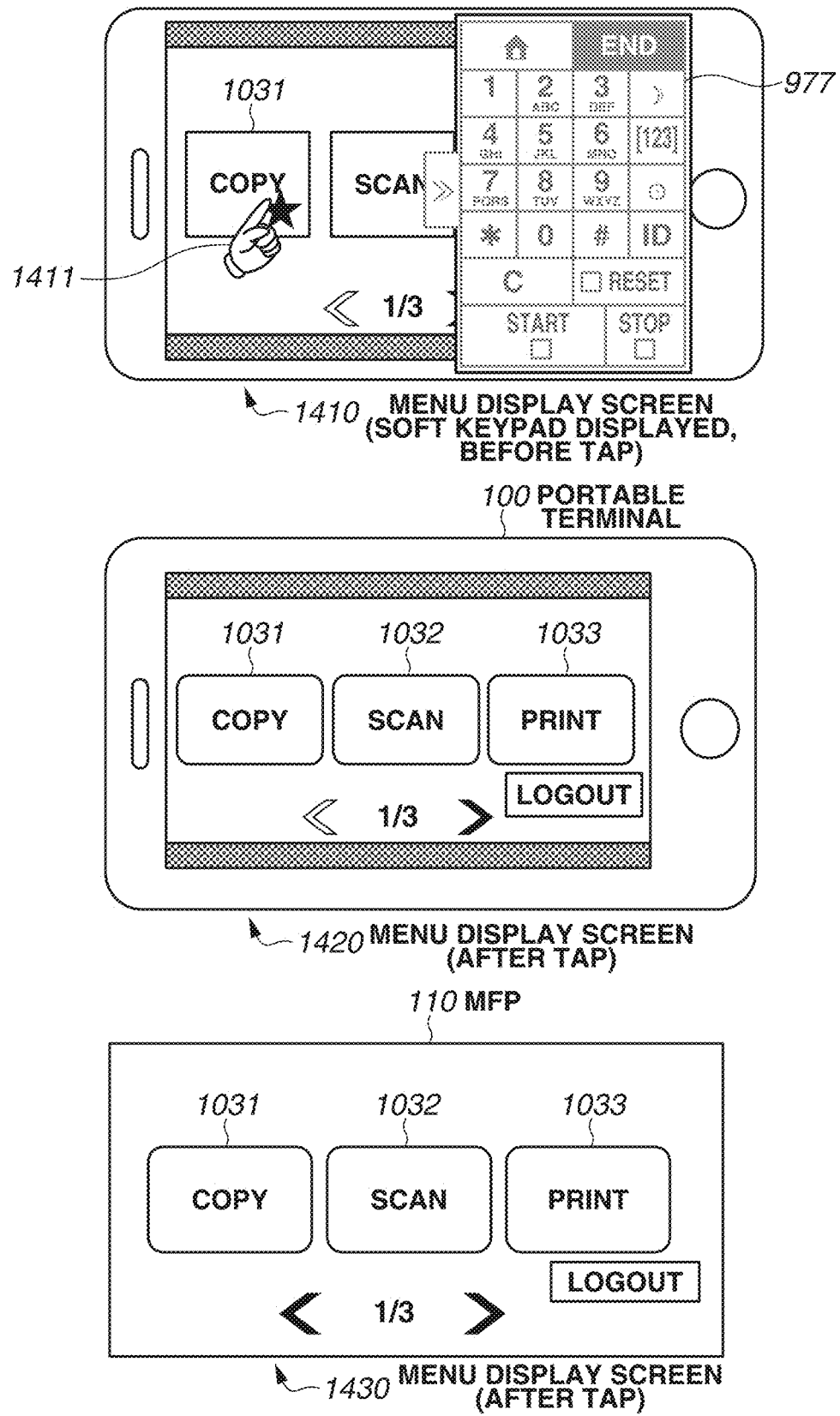
FIG. 14 is a diagram illustrating UIs displayed on the operation panels of the portable terminal and the MFP according to the third exemplary embodiment.

FIG. 14 illustrates screens displayed on the portable terminal 100 and the MFP 110 when the portable terminal 100 receives a tap operation 1411 while the portable terminal 100 displays the menu display screen 975 (hard keypad displayed). When the user performs the tap operation 1411 on the copy button 1031 on a menu display screen 1410 (soft keypad displayed, before tap) that currently displays the hard keypad UI 977, the portable terminal 100 closes the hard keypad UI 977 and displays a menu display screen 1420 (after tap). At this time, the portable terminal 100 does not transmit the operation information about the tap operation 1411 to the MFP 110. In other words, even if the portable terminal 100 receives a tap operation, the MFP 110 keeps displaying a menu display screen 1430 (after tap) like the menu display screen 1030.

The basic configuration of the flowchart indicating the processing of the portable terminal 100 according to the present exemplary embodiment is similar to that of the flowchart in FIG. 6 according to the first exemplary embodiment, and only differences will be described below. In step S611, the screen control unit 301 determines whether the operation received in step S610 is a tap operation on a region other than the region of the hard keypad UI 977. When the received operation is determined to be a tap operation (YES in step S611), the processing proceeds to step S613. In step S613, the CPU 201 determines whether the portable terminal 100 currently displays the hard keypad UI 977. When the hard keypad UI 977 is determined to be currently displayed (YES in step S613), the processing proceeds to step S630. In step S630, the CPU 201 performs processing for hiding the hard keypad UI 977. On the other hand, when the hard keypad UI 977 is determined not to be currently displayed (NO in step S613), the processing proceeds to step S614. In step S614, the CPU 201 transmits the operation information to the MFP 110. When the operation received in step S610 is determined to be a tap operation on the hard keypad UI 977, the operation information will be transmitted from the portable terminal 100 to the MFP 110.

The above-described exemplary embodiment enables selecting whether to transmit the received operation information to the MFP 110 according to whether the soft keypad is currently displayed only on the portable terminal 100 that remotely control the MFP 110.

Although, in the above-described exemplary embodiments, the portable terminal 100 displays the same screen as the one displayed on the MFP 110, via a VNC link, the present disclosure is not limited thereto. The above-described exemplary embodiments are applicable to a case where, for example, the portable terminal 100 displays an enlarged form of the screen of the MFP 110 instead of displaying the same screen as the one of the MFP 110.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A method for an information processing apparatus that communicates with an image processing apparatus, the method comprising:
    generating a screen corresponding to a screen to be displayed on a display unit of the image processing apparatus based on a display control by the image processing apparatus and displaying the screen on a display unit of the information processing apparatus; and
    displaying, when a predetermined user operation is received on the screen displayed on the display unit of the information processing apparatus, a screen based on operation information corresponding to the predetermined user operation on the image processing apparatus,
    wherein, in a case where the predetermined user operation is received on the screen displayed on the display unit of the information processing apparatus in a state where a display form of the screen displayed on the display unit of the information processing apparatus has been changed, the screen based on the operation information corresponding to the predetermined user operation is not displayed on the image processing apparatus.

2. The method according to claim 1, wherein the predetermined user operation is an operation accompanied by a movement of an indication object.

3. The method according to claim 1, wherein the predetermined user operation is a drag operation, a flick operation, or a swipe operation.

4. The method according to claim 1, wherein the state where the display form has been changed is a state where an enlargement rate of the screen has been changed.

5. The method according to claim 1, wherein the operation information corresponding to the predetermined user operation includes information about a position where the predetermined user operation is detected.

6. The method according to claim 1, wherein the information processing apparatus issues a print instruction or a scan instruction to the image processing apparatus.

7. The method according to claim 1, wherein, in the display control, the same screen as the screen to be displayed on the display unit of the image processing apparatus is displayed on the display unit of the information processing apparatus.

8. The method according to claim 1,
wherein the information processing apparatus and the image processing apparatus establish a Virtual Network Computing (VNC) link, and
wherein the display control is a control using VNC.

9. The method according to claim 1, wherein, in a case where the predetermined user operation is received on the screen displayed on the display unit of the information processing apparatus in a state where an enlargement rate of the displayed screen has been changed, the screen based on the operation information corresponding to the predetermined user operation is not displayed on the image processing apparatus.

10. The method according to claim 1, wherein, in a case where the information processing apparatus receives a drag operation on the screen in a state where the displayed screen is enlarged on the information processing apparatus and is not enlarged on the image processing apparatus, a screen based on operation information corresponding to the drag operation is not displayed on the image processing apparatus, and an enlarged display region of a screen to be displayed on the information processing apparatus is changed.

11. The method according to claim 1,
wherein, in a case where the predetermined user operation is received on the screen in a state where the display form of the displayed screen remains unchanged, the screen based on the operation information corresponding to the predetermined user operation is displayed on the image processing apparatus, and
wherein, in a case where the predetermined user operation is received on the screen in a state where the display form of the displayed screen has been changed, the screen based on the operation information corresponding to the predetermined user operation is not displayed on the image processing apparatus.

12. The method according to claim 1, wherein, in a case where an operation other than the predetermined user operation is received on the screen in a state where the display form of the displayed screen has been changed, a screen based on operation information corresponding to the operation other than the predetermined user operation is displayed on the image processing apparatus.

13. The method according to claim 12, wherein, in a case where the operation other than the predetermined user operation is received on the screen in a state where the display form of the displayed screen has been changed, the operation information corresponding to the operation other than the predetermined user operation is calculated based on at least an enlargement rate of the screen and a position where the operation other than the predetermined user operation is received, and a screen based on the calculated operation information is displayed on the image processing apparatus.

14. The method according to claim 1, wherein, in a case where the predetermined user operation is received on the screen displayed on the display unit of the information processing apparatus in a state where the display form of the screen displayed on the display unit of the information processing apparatus has been changed, the information processing apparatus does not transmit the operation information corresponding to the predetermined user operation to the image processing apparatus, thereby the screen based on the operation information corresponding to the predetermined user operation is not displayed on the image processing apparatus.

15. The method according to claim 1, wherein, in a case where the predetermined user operation is received on the screen displayed on the display unit of the information processing apparatus in a state where the display form of the screen displayed on the display unit of the information processing apparatus has been changed, the image processing apparatus does not execute the display control based on the operation information corresponding to the predetermined user operation, thereby the screen based on the operation information corresponding to the predetermined user operation is not displayed on the image processing apparatus.

16. The method according to claim 1, wherein, in a case where the predetermined user operation is received on the screen displayed on the display unit of the information processing apparatus in a state where the display form of the screen displayed on the display unit of the information processing apparatus has not been changed, the screen based on the operation information corresponding to the predetermined user operation is displayed on the image processing apparatus.

17. The method according to claim 16, wherein, in a case where the predetermined user operation is received on the screen displayed on the display unit of the information processing apparatus in a state where the display form of the screen displayed on the display unit of the information processing apparatus has not been changed, the information processing apparatus transmits the operation information corresponding to the predetermined user operation to the image processing apparatus, thereby the screen based on the operation information corresponding to the predetermined user operation is displayed on the image processing apparatus.

18. An information processing apparatus configured to communicate with an image processing apparatus, the information processing apparatus comprising:
one or more processors configured to cause the information processing apparatus to perform:
generating a screen corresponding to a screen to be displayed on a display unit of the image processing apparatus based on a display control by the image processing apparatus and displaying the screen on a display unit of the information processing apparatus; and
displaying, in a case where a predetermined user operation is received on the screen displayed on the display unit of the information processing apparatus, a screen based on operation information corresponding to the predetermined user operation on the image processing apparatus,
wherein, in a case where the predetermined user operation is received on the screen displayed on the display unit of the information processing apparatus in a state where a display form of the screen displayed on the displaying unit of the information processing apparatus has been changed, the screen based on the operation information corresponding to the predetermined user operation is not displayed on the image processing apparatus.

19. A non-transitory computer-readable storage medium storing one or more programs including instructions, which when executed by one or more processors of an information processing apparatus configured to communicate with an image processing apparatus, cause the information processing apparatus to perform a method comprising:

generating a screen corresponding to a screen to be displayed on a display unit of the image processing apparatus based on a display control by the image processing apparatus and displaying the screen on a display unit of the information processing apparatus; and displaying, in a case where a predetermined user operation is received on the screen displayed on the display unit of the information processing apparatus, a screen based on operation information corresponding to the predetermined user operation on the image processing apparatus, wherein, in a case where the predetermined user operation is received on the screen displayed on the display unit of the information processing apparatus in a state where a display form of the screen displayed on the display unit of the information processing apparatus has been changed, the screen based on the operation information corresponding to the predetermined user operation is not displayed on the image processing apparatus.

20. A method for an information processing apparatus that communicates with an image processing apparatus, the method comprising:

generating a screen corresponding to a screen to be displayed on a display unit of the image processing apparatus based on a display control by the image processing apparatus and displaying the screen on a display unit of the information processing apparatus; and displaying, when a predetermined user operation is received on the screen displayed on the display unit of the information processing apparatus, a screen based on operation information corresponding to the predetermined user operation on the image processing apparatus, wherein, in a case where the predetermined user operation is received on the screen displayed on the display unit of the information processing apparatus in a state where a display form of the screen displayed on the display unit of the information processing apparatus has been changed, control is executed so that the screen based on the operation information corresponding to the predetermined user operation is not displayed on the image processing apparatus.

21. The method according to claim 20, wherein, in a case where the predetermined user operation is received on the screen displayed on the display unit of the information processing apparatus in a state where the display form of the screen displayed on the display unit of the information processing apparatus has been changed, the information processing apparatus does not transmit the operation information corresponding to the predetermined user operation to the image processing apparatus, thereby the screen based on the operation information corresponding to the predetermined user operation is not displayed on the image processing apparatus.

22. The method according to claim 20, wherein, in a case where the predetermined user operation is received on the screen displayed on the display unit of the information processing apparatus in a state where the display form of the screen displayed on the display unit of the information processing apparatus has been changed, the information processing apparatus transmits the operation information corresponding to the predetermined user operation and unrecognizable by the image processing apparatus to the image processing apparatus, thereby the screen based on the operation information corresponding to the predetermined user operation is not displayed on the image processing apparatus.

23. The method according to claim 20, wherein, in a case where the predetermined user operation is received on the screen displayed on the display unit of the information processing apparatus in a state where the display form of the screen displayed on the display unit of the information processing apparatus has not been changed, the screen based on the operation information corresponding to the predetermined user operation is displayed on the image processing apparatus.

24. The method according to claim 23, wherein, in a case where the predetermined user operation is received on the screen displayed on the display unit of the information processing apparatus in a state where the display form of the screen displayed on the display unit of the information processing apparatus has not been changed, the information processing apparatus transmits the operation information corresponding to the predetermined user operation to the image processing apparatus, thereby the screen based on the operation information corresponding to the predetermined user operation is displayed on the image processing apparatus.

25. A system including an image processing apparatus and an information processing apparatus that communicates with an image processing apparatus, the system comprising:

a display unit configured to generate a screen corresponding to a screen to be displayed on a display unit of the image processing apparatus based on a display control by the image processing apparatus and display the screen on a display unit of the information processing apparatus;

a receiving unit configured to receive a predetermined user operation on the screen displayed on the display unit of the information processing apparatus; and a display control unit configured to display, when a predetermined user operation is received on the screen displayed on the display unit of the information processing apparatus, a screen based on operation information corresponding to the predetermined user operation on the image processing apparatus, and configured to execute control so that the screen based on the operation information corresponding to the predetermined user operation is not displayed on the image processing apparatus in a case where the predetermined user operation is received on the screen displayed on the display unit of the information processing apparatus in a state where a display form of the screen displayed on the display unit of the information processing apparatus has been changed.

26. The system according to claim 25, wherein, in a case where the predetermined user operation is received on the screen displayed on the display unit of the information processing apparatus in a state where the display form of the screen displayed on the display unit of the information processing apparatus has been changed, the information processing apparatus does not transmit the operation information corresponding to the predetermined user operation to the image processing apparatus, thereby the display control unit executes control so that the screen based on the operation information corresponding to the predetermined user operation is not displayed on the image processing apparatus.

27. The system according to claim 25, wherein the image processing apparatus does not execute the display control based on the operation information corresponding to the predetermined user operation, thereby the display control unit executes control so that the screen based on the operation information corresponding to the predetermined user operation is not displayed on the image processing apparatus.

28. The system according to claim 25, wherein, in a case where the predetermined user operation is received on the screen displayed on the display unit of the information processing apparatus in a state where the display form of the screen displayed on the display unit of the information processing apparatus has not been changed, the display control unit displays the screen based on the operation information corresponding to the predetermined user operation on the image processing apparatus.

29. The system according to claim 28, wherein, in a case where the predetermined user operation is received on the screen displayed on the display unit of the information processing apparatus in a state where the display form of the screen displayed on the display unit of the information processing apparatus has not been changed, the information processing apparatus transmits the operation information corresponding to the predetermined user operation to the image processing apparatus, thereby the display control unit displays the screen based on the operation information corresponding to the predetermined user operation on the image processing apparatus.

\* \* \* \* \*